US007235796B2

(12) United States Patent
Kolodney et al.

(10) Patent No.: US 7,235,796 B2
(45) Date of Patent: Jun. 26, 2007

(54) METHOD AND APPARATUS FOR THE GENERATION OF ANIONIC AND NEUTRAL PARTICULATE BEAMS AND A SYSTEM USING SAME

(75) Inventors: Eli Kolodney, Haifa (IL); Anatoly Bekkerman, Haifa (IL); Boris Tsipinyuk, Nesher (IL)

(73) Assignee: Technion Research & Development Foundation Ltd., Haifa (IL)

( * ) Notice: Subject to any disclaimer, the term of this patent is extended or adjusted under 35 U.S.C. 154(b) by 395 days.

(21) Appl. No.: 10/995,370

(22) Filed: Nov. 24, 2004

(65) Prior Publication Data

US 2006/0118405 A1 Jun. 8, 2006

(51) Int. Cl.
*H05F 3/00* (2006.01)
*H01J 49/14* (2006.01)
*B01J 19/08* (2006.01)
*C01B 31/00* (2006.01)

(52) U.S. Cl. ................. 250/492.21; 250/306; 250/307; 250/309; 250/396 R; 250/397; 250/423 R; 250/424; 250/492.1; 250/492.3

(58) Field of Classification Search ................. 250/309
See application file for complete search history.

(56) References Cited

U.S. PATENT DOCUMENTS 4,564,758 A * 1/1986 Slodzian et al. ............ 250/309
4,611,120 A * 9/1986 Bancroft et al. ............ 250/307
4,740,697 A * 4/1988 Suzuki ....................... 250/309
4,967,078 A * 10/1990 Purser ........................ 250/309
4,968,888 A * 11/1990 Appelhans et al. ......... 250/306
5,359,254 A * 10/1994 Arkhipov et al. ............. 313/15
6,303,932 B1 * 10/2001 Hamamura et al. ......... 250/309
2006/0118405 A1 * 6/2006 Kolodney et al. .......... 204/173

FOREIGN PATENT DOCUMENTS

GB 2386747 9/2003

OTHER PUBLICATIONS

Bekkerman et al. "Thermally Activated Decay Channels of Superhot C-60: Delayed Electron Emission and Dissociative Attachment Studied by Hyperthermal Negative Surface Ionization", International Journal of Mass Spectrometry, 185/186/187: 773-786, 1999.

(Continued)

*Primary Examiner*—Nikita Wells
*Assistant Examiner*—Bernard Souw

(57) ABSTRACT

An apparatus for the generation of anionic and neutral particulate beams is described. The apparatus comprises a duct defined by walls having an inner surface capable of sustaining a temperature above an electron emission temperature of the surface, so as to negatively charge electrically neutral particles being passed through the duct when the surface is heated to the temperature; a heating element for heating the inner surface to the temperature; and an acceleration electrode for ion-optically controlling and manipulating the negatively charged particles into the anion beam. The apparatus may further comprise a protection electrode defining a protected region, which substantially prevent emitted electrons from escaping the protected region. Moreover, a system for analyzing substances ejected from a surface of a sample bombarded with an anion beam generated by the apparatus is described. The system further comprises a detector for detecting the substances once ejected of the surface. Further, a method of generating an anion beam is described.

272 Claims, 14 Drawing Sheets

OTHER PUBLICATIONS

Vakar et al. "Growth of Crystallites Consisting of C60 Molecules on Heated (100)Mo", JETP Letters, 67(12): 1024-1028, 1998.

Wong et al. "Development of A C60+ Ion Gun for Static SIMS and Chemical Imaging", Applied Surface Science, 203-204: 219-222, 2003.

Budrevich et al. "Critical Behaviour of Super-Heated (1900-2000 K) C60 Vapours", J. Phys. B: At. Mol. Opt. Phys., 29: 4965-4974, 1996.

Horak et al. "Broad Fullerene-Ion Beam Generation and Bombardment Effects", Appl. Phys. Lett., 65(8): 968-970, 1994.

Bekkerman et al. "Above the Surface Multifragmentation of Surface Scattered Fullerenes", Journal of Chemical Physics, 120(23): 11026-11030, 2004.

Matejčik et al. "Formation and Decay of C-60 Following Free Electron Capture by C60", Journal of Chemical Physics, 102(6): 2516-2521, 1995.

Baudin et al. "A Spontaneous Desorption Source for Polyatomic Ion Production", Rapid Communications in Mass Spectrometry, 12: 852-856, 1998.

Biri et al. "Production of Multiply Charged Fullerene and Carbon Cluster Beams by the ECR Ion Source", Rev. Sci. Instr., 73(2): 65, 2002.

Weibel et al. "A C60 Primary Ion Beam System for Time of Flight Secondary Ion Mass Spectrometry: Its Development and Secondary Ion Yield Characteristics", Analytical Chemistry, 75(7): 1754-1764, 2003.

* cited by examiner

METHOD AND APPARATUS FOR THE GENERATION OF ANIONIC AND NEUTRAL PARTICULATE BEAMS AND A SYSTEM USING SAME

FIELD AND BACKGROUND OF THE INVENTION

The present invention relates to the generation of particulate beams characterized by high brightness and small emission area, and more particularly, to an apparatus and method for the generation of neutral and anionic particulate beams. Even more particularly, the present invention generates anionic and neutral fullerene beams. The present invention also relates to a method for generating neutral and anionic particulate beams, and more particularly to a method for generating anionic and neutral fullerene beams. The present invention also relates to a system that utilizes a particulate beam for analyzing substances ejected from a surface of a sample bombarded with the particulate beam.

Fullerenes:

Fullerenes, most notably $C_{60}$, are a newly discovered form of carbon. The fullerenes are a family of hollow (cage) all-carbon structures. $C_{60}$ is the most prominent member of this family. $C_{60}$ is a perfectly symmetrical molecule composed of 60 carbon atoms arranged on the surface of a sphere in an array of 12 pentagons and 20 hexagons (a soccer-ball molecule). $C_{60}$ has many unique properties but most relevant here arc its structural rigidity (closed cage) and its thermal and collisional stability.

Other relatively common fullerenes are $C_{70}$, $C_{76}$ and $C_{84}$. Their structure is described in ["Science of fullerenes and carbon Nanotubes," M. S. Dresselhaus et. al., Academic Press, San-Diego 1996] which is incorporated herein by reference. Fullerene cages are approximately 7–15 Angstroms in diameter. The molecules are relatively stable; the molecules dissociate at temperatures above 1000 C. Fullerenes sublime at much lower temperatures, i.e., a few hundred degrees C.

Neutral and Anionic Particulate Beams

The production of neutral and anionic particulate beams is of considerable importance in such diverse areas as atomic, molecular and plasma physics, thin film deposition, surface etching, ion implantation, submicron lithography, nano-electro-mechanical and nanophotonic system construction, new material synthesis, and electric propulsion devices. Applications utilizing anionic particulate beams find use in fundamental science areas, e.g., surface chemistry and catalysis, organic chemistry, and biology. For example, FAB (Fast Atom Bombardment) and TOF-SIMS (Time Of Flight Secondary Ion Mass Spectrometry) instruments are widely used for tailoring and analyzing new biomaterials and organic structures on the molecular level in the fields of pharmacology and biotechnology.

The use of energetic cluster or polyatomic neutrals or ions as primary projectiles for static SIMS analysis of organic and inorganic samples has many advantages compared to the traditionally used atomic ion collider. Polyatomic or cluster ions produce significantly higher yield of secondary ions (5–100 times) as compared to atomic ions. This yield enhancement relates to the fact that the deposited impact energy is distributed over a broader surface region than for an atomic species. Therefore, the use of fullerene ion projectiles as the primary beam is attractive due to the shallow penetration of the fullerene ion projectile into the bulk and the extremely high surface sensitivity of the adsorbed molecules analysis.

The most important features of ion sources used for SIMS applications and for submicron-level micro fabrication are maximal brightness and minimal emission area of the beam. These two parameters enable both tight focusing of the beam for surface imaging (nanoprobe beam formation) and a high beam density for dynamic SIMS depth profiling. Various methods for the generation of positive and negative fullerene ion beams have been used, e.g., laser ablation and desorption of graphite or fullerene targets [M S Dresselhaus et al., "Science of Fullerenes and Carbon Nanotubes", Academic Press, San Diego, Calif., 1996; HD Busmann et al., "Surface Science", 272: 146, 1992], fission fragments impact on a $C_{60}$ coated surfaces [K Baudin et al., "A Spontaneous Desorption Source For Polyatomic Ion Production", Rapid Comm. in Mass Spect. 12 (13): 852–856, 1998], fullerene thermal desorption combined with electron attachment or electron impact ionization [T Jaffke et al., "Formation of $C_{60}^-$ and $C_{70}^-$ By Free Electron Capture. Activation Energy And Effect of the Internal Energy On Lifetime", Chem. Phys. Lett. 226: 213–218, 1994; SCC Wong et al., "Development Of A C-60(−) Ion Gun for Static SIMS and Chemical Imaging", Appl. Surf. Sci. 203: 219–222, 2003; D Weibel et al., "A C-60 Primary Ion Beam System For Time of Flight Secondary Ion Mass Spectrometry: Its Development and Secondary Ion Yield Characteristics", Anal. Chem. 75 (7): 1754–1764, 2003]. Attempts have also been made to use conventional ion sources (arc-discharge and sputtering type) [PD Horak et al., "Broad Fullerene-Ion Beam Generation and Bombardment Effects", Applied Physics Letters, 65 (8): 968–970, 1994; S Biri et al., "Production of Multiply Charged Fullerene and Carbon Cluster Beams by a 14.5 GHz ECR Ion Source", Review of Sci. Instr. 73(2): 881–883, 2002; C Sun et al., "Extraction of $C_{60}^-$ and Carbon Cluster Ion Beams from a Cs Sputtering Negative Ion Source", Fudan Univ., Shanghai, Peop. Rep. China. Hejishu 17(7): 407–410, 1994]. These methods have various drawbacks when used for submicron focused beam applications. Among these are the complexity of the source, the need for an additional mass filter due to fragmentation upon ionization, low current density and brightness, and large energy dispersion of ions or poor focusing.

It is well known that for many polyatomic molecules the attachment cross section at near zero electron kinetic energy can be quite large. For example, direct interaction of fullerenes with thermal electrons produces very long-lived metastable anions. The energy due to the captured extra electron (comprised of the kinetic energy of the free electron plus the molecular electron affinity) is effectively dissipated among the vibrations of the molecular ion. The ion may decay via delayed (10 μs–10 ms) autodetachment.

A typical prior art apparatus for the generation of molecular anions includes a monochromatic electron source for providing the low energy electron beam (0.1–2 eV) [E Illenberg et al., "Gaseous molecular ions. An Introduction to Elementary Processes Induced By Ionization" (Stenkopff/Springer, Darmstadt, Berlin), 1992]. The electron beam is crossed at a right angle to a molecular beam effusing from a capillary. The capillary is connected to an oven containing a fullerene sample. The oven is kept at the temperature in the range of 600–800 K. Negative ions formed by electron capture are extracted from the reaction volume by a weak electric field and are accelerated to a given energy onto the entrance of the ion beam formation system. The main disadvantage of this method is low beam brightness due to the large ionization volume needed to generate high ion current and an inability to introduce a strong electrostatic field into the reaction volume as needed due to strong effects of external fields on trajectories and energy of electrons and depression of the ionization process.

Reference is now made to FIG. 1, which is a schematic illustration of a prior art apparatus 20 for the generation of fullerene negative ions based on a surface ionization process. In a surface ionization process, a plurality of neutral molecules is adsorbed onto a hot surface with a low work function. A portion of the plurality of neutral molecules is then ionized as the molecules emitted from the surface. The prior art apparatus is described in Russian Patent No. 2074451 to L. N. Sidorov, et al.

Apparatus 20 of FIG. 1 comprises an internal effusive cell 22 nested inside an external effusive cell 24. Internal cell 22 has an effusive orifice 30 and contains a fullerene mixture powder 26. External cell 24 also has an effusive orifice 32 and contains a material 28 that reduces the work function of its walls. In the reported method, material 28 is a mixture of $AlF_3$+KF. Cells 22 and 24 are manufactured from nickel.

Cell 22 and cell 24 are heated simultaneously so that the internal pressure of the nested cells 22 and 24 reaches the equilibrium vapor pressure of fullerene. Negative surface ionization of the plurality of fullerenes takes place on the walls of external cell 24. The ionized molecules are extracted from orifice 32 on the front conical part of external cell 24. The ionized molecules are accelerated by the applied electric field (not shown).

The apparatus of FIG. 1 is disadvantageous for use in microprobe SLMS applications. First, because of a large ionization volume, the ion beam is of a low brightness and low ion current density ($<5\times10^{-7}$ A·cm$^{-2}$). Second, the ionization efficiency of the apparatus depends on the equilibrium vapor pressure of the fullerene and activator molecules ($AlF_3$+KF). Third, the final ion beam current is difficult to control and adjust over a wide range because the ion current continues so long as activator molecules 28 exist in external cell 24. Fourth, because external and internal cells 22 and 24 arc heated simultaneously using the same oven, it is impossible to efficiently achieve a combined optimal level of fullerene vapor pressure, activator vapor pressure and surface temperature of external cell 24. Fifth, the apparatus of FIG. 1 is inherently inefficient in using the fullerene powder due to intensive effusion of neutral fullerene molecules through the wide exit orifice 32 and also due to the destruction of a portion of the fullerene molecules by a catalytic reaction by interaction of the fullerenes with the hot nickel surface of external cell 24.

There is thus a widely recognized need for, and it would be highly advantageous to have an apparatus for generating neutral and anionic particulate beams, and a method for generating neutral and anionic particulate beams devoid of the above limitations. More particularly, it would be highly advantageous to have an apparatus and method for generating anionic and neutral fullerene beams.

SUMMARY OF THE INVENTION

In various exemplary embodiments of the invention, an anionic particulate beam is generated by heating a nonreactive vessel containing a plurality of neutral particles to a temperature above an electron emission temperature so as to generate anionic particles. The anionic particles are accelerated out of the nonreactive vessel by a positive electrical potential applied in the front of the vessel. In various exemplary embodiments of the invention, a neutral particulate beam is generated by ion-optically controlling manipulating of a plurality of anionic particles having undergone electron autodetachment from the anionic particulate beam.

According to further features in preferred embodiments of the invention described below, the ion-optical control and manipulation is effected by at least one procedure selected from the group consisting of extraction, acceleration, deflection and focusing.

According to one aspect of the present invention, there is provided an apparatus for generating an anion beam, comprising a duct defined by walls having an inner surface capable of sustaining a temperature above an electron emission temperature of the inner surface, so as to negatively charge electrically neutral particles being passed through the duct when the inner surface is heated to the temperature above the electron emission temperature; a heating element for heating the inner surface to the temperature above the electron emission temperature; and an acceleration electrode for optically manipulating and focusing the negatively charged particles into the anion beam.

According to another aspect of the present invention, there is provided an apparatus for generating a neutral particulate beam, comprising a duct defined by walls having an inner surface capable of sustaining a temperature above an electron emission temperature of the inner surface, so as to negatively charge electrically neutral particles being passed through the duct when the inner surface is heated to the temperature above the electron emission temperature; a heating element for heating the inner surface to the temperature above the electron emission temperature; and an acceleration electrode for optically manipulating the negatively charged particles into an anion beam, whereby at least a portion of the negatively charged particles undergo electron autodetachment so as to generate the neutral particulate beam.

According to further features in the described preferred embodiments, the walls comprise a material characterized by a maximum service temperature of 2000 K. According to further features in the described preferred embodiments, the walls comprise a material characterized by a minimum service temperature of 1200 K.

According to still further features in the described preferred embodiments, the walls comprise a material characterized by a melting point above 2200 K.

According to still further features in the described preferred embodiments, the walls comprise a material characterized by a high resistivity at room temperature, the resistivity decreasing by at least five orders of magnitude when the material is heated to approximately electron emission temperature.

According to still further features in the described preferred embodiments, the walls comprise a material is characterized by chemical inertness up to the maximum service temperature of the walls.

According to still further features in the described preferred embodiments, the walls comprise a material selected a group consisting of metal oxides (such as, but not limited to, aluminum oxide and zirconium oxide) graphite, boron-nitride ceramic and many other kinds of high temperature ceramics. According to still further features in the described preferred embodiments, the material comprises alumina. According to still further features in the described preferred embodiments, the material is a source of electrons.

According to still further features in the described preferred embodiments, the material is selected such that a residue generated from the electrically neutral particles activates the material so as to increase electron emission.

According to still further features in the described preferred embodiments, the material is selected such that a facilitating agent activates the material so as to increase electron emission. According to still further features in the described preferred embodiments, the facilitating agent is $Cs_2CrO_4$ or $Cs_2CO_3$.

According to still further features in the described preferred embodiments, the diameter of the duct is in the range of a few microns to a few millimeters, more preferably from 50 microns to 300 microns most preferably from of 100 microns to 160 microns.

According to still further features in the described preferred embodiments, the electrically neutral particles comprise carbon particles. According to still further features in the described preferred embodiments, the electrically neutral particles comprise $C_{60}$ molecules.

According to still further features in the described preferred embodiments, the electrically neutral particles comprise an aggregate of different molecules. According to still further features in the described preferred embodiments, the electrically neutral particles comprise a mixture of fullerenes.

According to still further features in the described preferred embodiments, the electrically neutral particles are selected from a group consisting of $I_2$, $SF_6$, $CFCl_3$, $WF_6$, F, Cl, and perhallogenated carbon compounds.

According to still further features in the described preferred embodiments, the body of the acceleration electrode comprises a centered orifice through which the beam emanates, said orifice being coaxial with an optical axis of the beam, and a central axis of the duct.

According to still further features in the described preferred embodiments, the apparatus further comprises a protection electrode defining a protected region, wherein the protection electrode prevents emitted electrons from escaping the protected region.

According to still further features in the described preferred embodiments, the body of the protection electrode comprises a centered orifice through which the beam emanates, the orifice being coaxial with an optical axis of the beam, and the center of the duct.

According to still further features in the described preferred embodiments, the heating element is at a first electrical potential, and the protection electrode is at a second electrical potential, the first electrical potential being positive with respect to the second electrical potential.

According to still further features in the described preferred embodiments, the heating element is at a first electrical potential, and the protection electrode is at a second electrical potential, the first electrical potential being negative with respect to the second electrical potential.

According to still further features in the described preferred embodiments, the heating element comprises a rhenium ribbon, the ribbon wrapped around the walls, the ribbon electrically connected to a power supply.

According to still further features in the described preferred embodiments, the heating element comprises a heat-conductive body, kept at an electrical potential difference from an electron source, the heat-conductive body and the electron source being designed and constructed such that electrons, emitted by the electron source, accelerate in the electrical potential difference and bombard the heat-conductive body to thereby heat the heat-conductive body.

According to still further features in the described preferred embodiments, the heating element is at a first electrical potential, and the acceleration electrode is at a third electrical potential, the first electrical potential being negative with respect to the third electrical potential.

According to still further features in the described preferred embodiments, the apparatus further comprises one or more einzel lenses to focus the anionic beam.

According to still further features in the described preferred embodiments, the apparatus further comprises one or more gating electrodes for pulsed beam mode operation.

According to still further features in the described preferred embodiments, the apparatus further comprises deflector plates for raster scanning the anionic beam onto a surface.

According to still further features in the described preferred embodiments, the apparatus further comprises a first ingress port and a second ingress port into the duct, wherein the first port enables the neutral particles to be passed through the duct and the second port enables a facilitator agent to be passed through the duct, and wherein a first flow rate of the neutral particles and a second flow rate of the facilitator agent through the duct are separately controllable.

According to another aspect of the present invention, there is provided a method of generating an anion beam, comprising passing electrically neutral particles through a duct being defined by walls having an inner surface, while heating the inner surface to a temperature above a electron emission temperature of the inner surface, so as to negatively charge the particles, so as to obtain negatively charged particles; and focusing the negatively charged particles into the anion beam.

According to another aspect of the present invention, there is provided a method of generating a neutral particulate beam, comprising passing electrically neutral particles through a duct being defined by walls having an inner surface, while heating the inner surface to a temperature above a electron emission temperature of the inner surface, so as to negatively charge the particles, so as to obtain negatively charged particles; focusing the negatively charged particles into an anion beam, whereby at least a portion of the negatively charged particles undergo electron autodetachment; so as to generate the neutral particulate beam.

According to still further features in the described preferred embodiments, the method further comprises redirecting the anion beam so that a first axis characterizing the anion beam is displaced angularly from a second axis characterizing the neutral beam.

According to still further features in the described preferred embodiments, the method further comprises deflecting electrons emitted from the heating elements and/or detached electrons from an axis characterizing the anion beam. According to still further features in the described preferred embodiments, the deflection is by a magnet field.

According to still further features in the described preferred embodiments the method further comprises passing a facilitating agent through the duct in a simultaneous fashion with the electrically neutral particles so as to enhance the yield of said negatively charged particles. According to still further features in the described preferred embodiments, the facilitating agent enhances the efficiency of said electron emission.

According to still further features in the described preferred embodiments, the method further comprises raster scanning the anionic beam onto a surface for analysis. According to still further features in the described preferred embodiments, the method further comprises analyzing a plurality of fragments emitted from the surface as a result of the raster scanning so as to determine the chemical composition of the surface.

According to still further features in the described preferred embodiments, the anion beam is used for an application selected from a group consisting of atomic physics, molecular physics, plasma physics, thin film deposition, surface etching, ion implantation, submicron lithography, nano-electro-mechanical system construction, nanophotonic system construction, new material synthesis, and electric propulsion devices, such as, but not limited to, ion engines for micro-satellites.

According to still further features in the described preferred embodiments, the anion beam is used for an application selected from a group consisting of surface chemistry and catalysis, organic chemistry, biology, pharmacology and biotechnology.

According to another aspect of the present invention, there is provided a system for analyzing substances ejected from the surface of a sample bombarded with an anion beam, comprising: (a) an anion beam source, wherein the source comprises a duct defined by walls having an inner surface capable of sustaining a temperature above a electron emission temperature of the inner surface, so as to negatively charge electrically neutral particles being passed through the duct when the inner surface is heated to the temperature above the electron emission temperature; a heating element for heating the inner surface to the temperature above said electron emission temperature; and an acceleration electrode for optically manipulating the negatively charged particles into the anion beam, such that when the anion beam bombards the surface, the anion beam ejects substances of the surface; and (b) a detector for detecting the substances once ejected from the surface.

According to another aspect of the present invention, there is provided a system for analyzing substances ejected from the surface of a sample bombarded with a neutral particulate beam, comprising: (a) a neutral particulate beam source, wherein the source comprises a duct defined by walls having an inner surface capable of sustaining a temperature above a electron emission temperature of the inner surface, so as to negatively charge electrically neutral particles being passed through the duct when the inner surface is heated to the temperature above the electron emission temperature; a heating element for heating the inner surface to the temperature above the electron emission temperature; and an acceleration electrode for focusing the negatively charged particles into the anion beam, whereby at least a portion of the negatively charged particles undergo electron autodetachment so as to generate an energetic neutral particulate beam, such that when the neutral beam bombards the surface, the neutral beam ejects substances of the surface; and (b) a detector for detecting the substances once ejected from the surface.

According to another aspect of the present invention, there is provided a method for analyzing substances ejected from the surface of a sample bombarded with an anion beam, comprising: (a) passing electrically neutral particles through a duct being defined by walls having an inner surface, while heating the inner surface to a temperature above a electron emission temperature of the inner surface, so as to negatively charge said particles, so as to obtain negatively charged particles; and focusing the negatively charged particles into the anion beam; and (b) detecting the substances once ejected from the surface.

According to another aspect of the present invention, there is provided a method for analyzing substances ejected from the surface of a sample bombarded with a neutral particulate beam, comprising: (a) passing electrically neutral particles through a duct being defined by walls having an inner surface, while heating the inner surface to a temperature above a electron emission temperature of the inner surface, so as to negatively charge the particles, so as to obtain negatively charged particles, focusing the negatively charged particles into the anion beam, and focusing from the anion beam a separate energetic neutral beam by electron autodetachment from a portion of the negatively charged particles; and (b) detecting the substances once ejected from the surface.

According to further features in preferred embodiments of the invention described below, the detector is an energy mass analyzer.

According to still further features in the described preferred embodiments, the detector utilizes a wide energy window.

The present invention successfully addresses the shortcomings of the presently known configurations by providing an apparatus and method for generating neutral and anionic particulate beams that enjoy properties far exceeding the prior art.

Unless otherwise defined, all technical and scientific terms used herein have the same meaning as commonly understood by one of ordinary skill in the art to which this invention belongs. Although methods and substances similar or equivalent to those described herein can be used in the practice or testing of the present invention, suitable methods and substances are described below. In case of conflict, the patent specification, including definitions, will control. In addition, the substances, methods, and examples are illustrative only and not intended to be limiting.

Implementation of the method and set of the present invention involves performing or completing selected tasks or steps manually, automatically, or a combination thereof. Moreover, according to actual instrumentation and equipment of preferred embodiments of the method and set of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and set of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
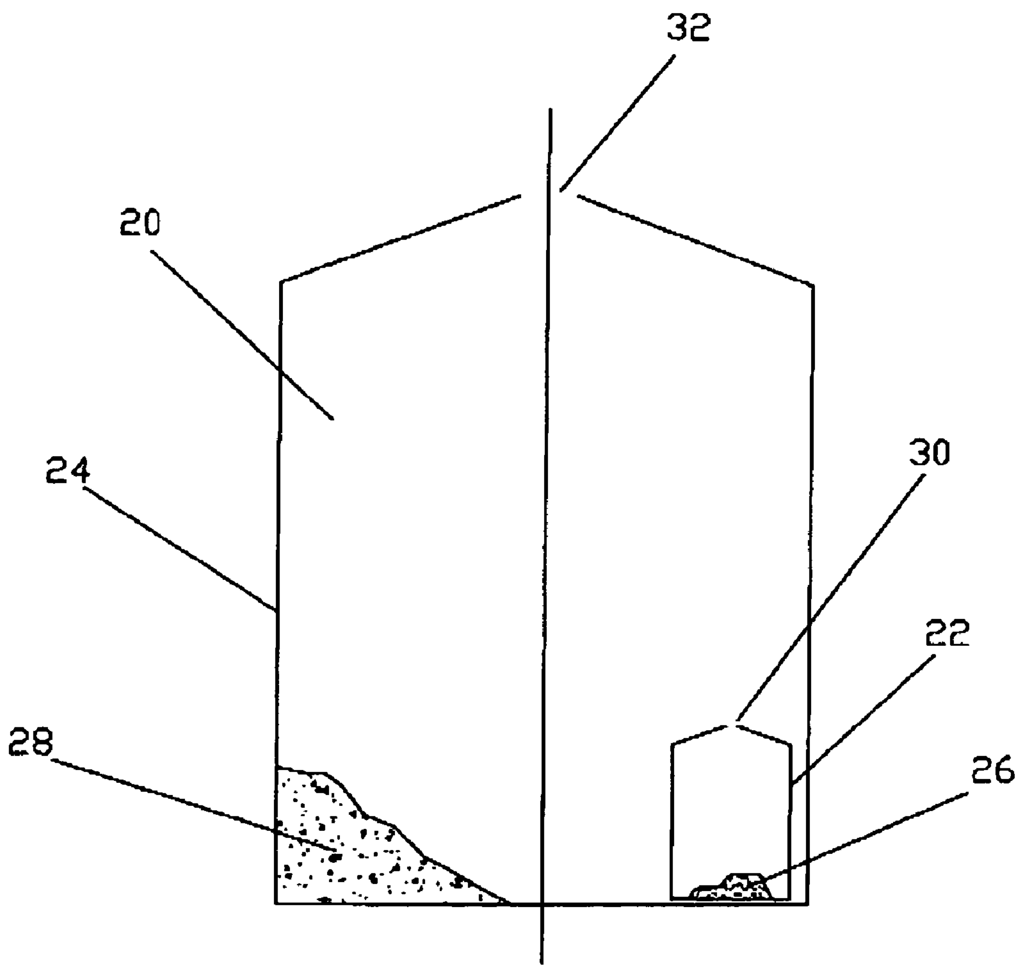
FIG. 1 is a schematic illustration of a prior art apparatus for the generation of fullerene negative ions based on a surface ionization process.

The present invention is of an apparatus and method for the generation of neutral and anionic particulate beams, anionic and neutral fullerene beams in particular, and uses thereof, in particular in a system and method for analyzing substances ejected from a surface of a sample bombarded with the neutral and anionic particulate beams.

The principles and operation of an apparatus, system and methods according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

While the invention is described herein with a particular emphasis to the generation of neutral and anionic carbon fullerene beams, it will be appreciated, as is further detailed below, that other particulates are as useful in implementing the present invention; and the more detailed reference to carbon fullerenes is not to be interpreted as limiting the scope of the invention in any way.

Figure 2:
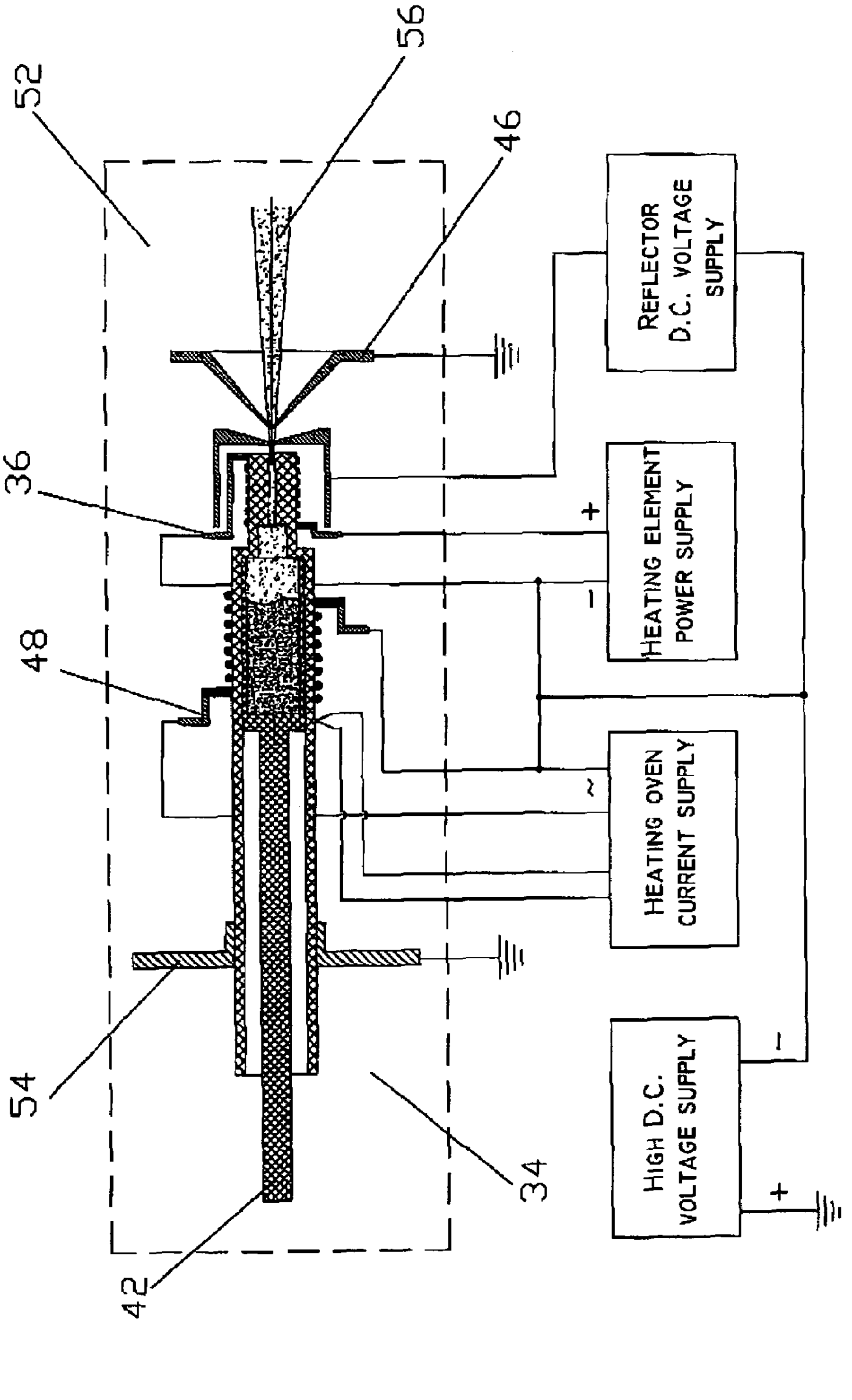
FIG. 2 is a schematic illustration of an ion source according to various exemplary embodiments of the present invention.
Figure 3:
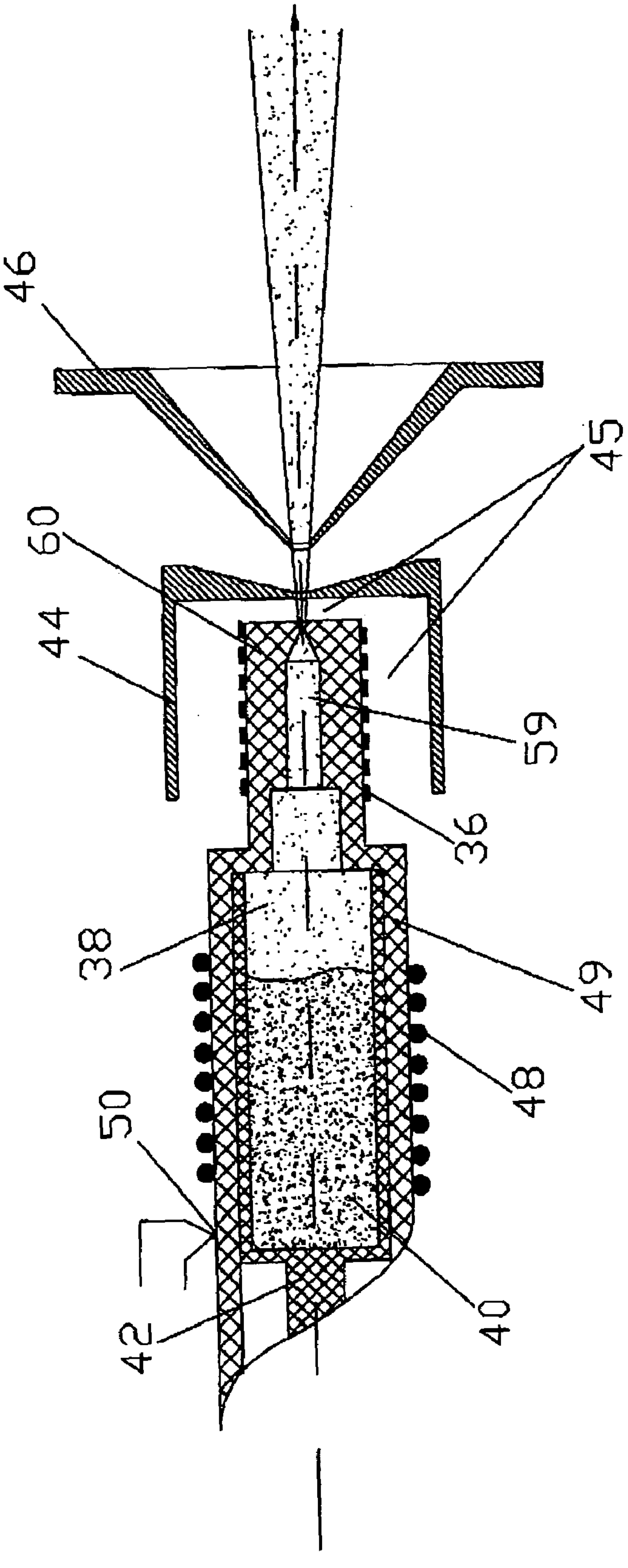
FIG. 3 is a schematic illustration of a cross-sectional view of an ion source according to various exemplary embodiments of the present invention.
Figure 4:
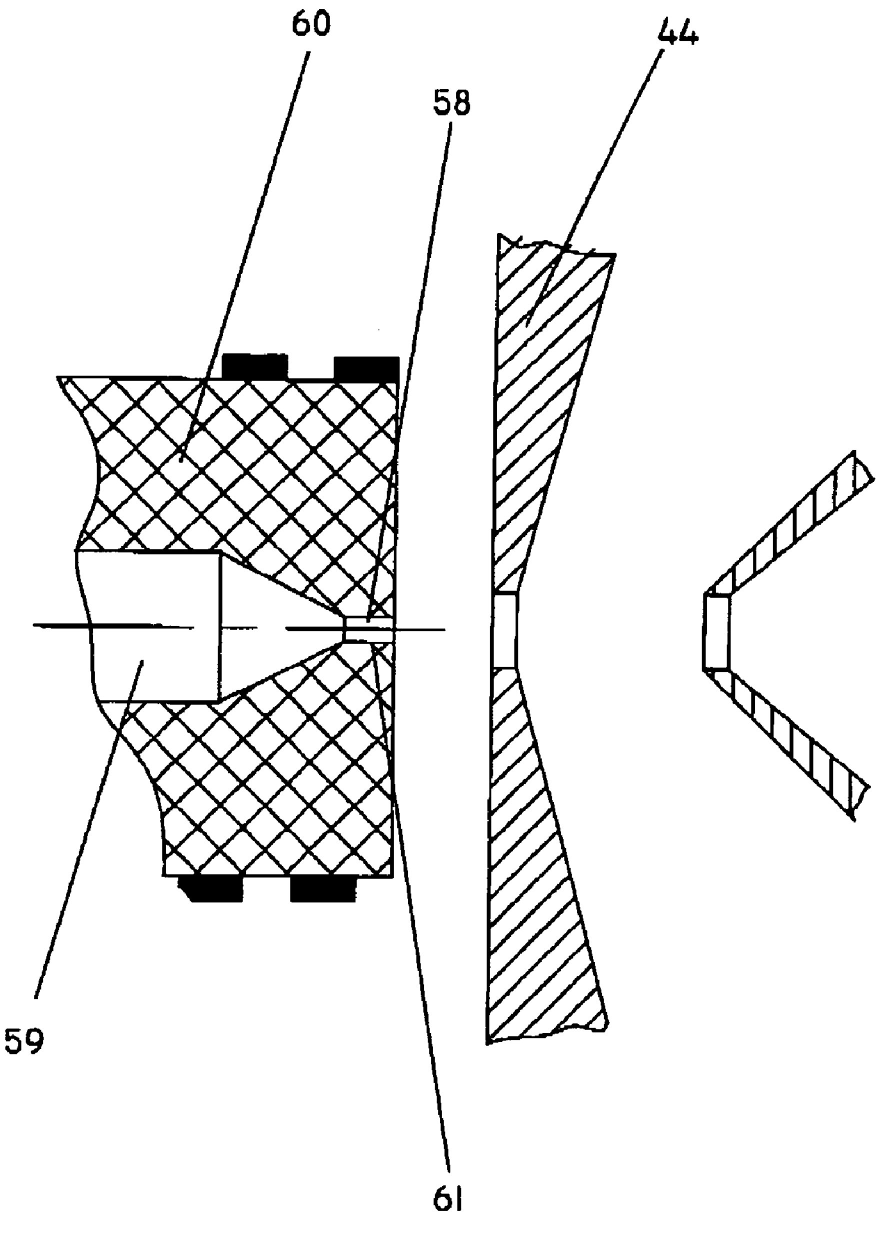
FIG. 4 is a schematic illustration of a cross-sectional view of an ion source according to various exemplary embodiments of the present invention.

Reference is now made to FIGS. 2, 3, 4 showing schematic illustrations of an apparatus 34 for generating anionic and neutral particulate beams according to various exemplary embodiments of the present invention. Apparatus 34 is both high vacuum and high pressure tight. The apparatus of various exemplary embodiments of the present invention comprises channel 59 (shown in FIGS. 3 and 4) ending with a duct 58 (shown in FIG. 4) defined by walls 60 having an inner surface 61 capable of sustaining a temperature above a electron emission temperature of the inner surface.

Apparatus 34 further comprises a heating element 36 for heating inner surface 61 to the temperature above the electron emission temperature. Electrically neutral particles being passed through duct 58 as walls 60 are heated by heating element 36 above the electron emission temperature are negatively charged by a process of low-energy electron capture. An acceleration electrode 46 ion-optically manipulates the negatively charged particles into an anion beam. Any ion-optical manipulation can be employed, including, without limitation extraction, acceleration, deflection and focusing in any combination. The diameter of duct 58 is selected so as to optimize the generation of negatively charged particles within apparatus 34. In various exemplary embodiments of the present invention, the diameter of the duct is in the range 50 microns to 300 microns. The diameter of the duct is preferably in the range of 100 microns to 160 microns.

Walls 60 are comprised of a material characterized by high temperature stability, mechanical strength, imperviousness to gas and extreme high chemical inertness at high temperatures. The criterion for chemical inertness is of crucial importance in preventing high-temperature oven chemistry. Therefore, in various exemplary embodiments of the present invention, walls 60 comprise a material characterized by a maximum service temperature of about 2000 K and a minimum service temperature of about 1200 K. In various exemplary embodiments of the invention, walls 60 comprise a material having a melting point above 2200 K. Further, walls 60 comprise a material characterized by chemical inertness, preferably up to the maximum service temperature.

Importantly, walls 60 comprise a material characterized by a high resistivity at room temperature. In various exemplary embodiments of the invention, the resistivity of the material decreases by at least five orders of magnitude when the material is heated to approximately electron emission temperature. Thus, the material serves a source of electrons.

Therefore, in various exemplary embodiments of the invention, walls 60 comprise a material selected a group consisting of metal oxide (such as, but not limited to, aluminum oxide and zirconium oxide), graphite, boron-nitride ceramic and many other kinds of high temperature ceramics. Preferably, walls 60 comprise alumina. Therefore, in a preferred embodiment of the present invention, apparatus 34 is constructed from a recrystallized, highly pure (ca. 99.8% or more) ultra high-density impervious alumina ceramic with a maximum service temperature of 2000 K.

The flux of fullerene molecules through an alumina ceramic assembly, for example, is stable up to 1950 K [A. Budrevich et al., "Critical Behavior of Super-Heated (1900–2000 K) $C_{60}$ Vapor," J. Phys. B. At. Mol. Opt. Phys. 39: 4965–4974, 1996]. Contrarily, refractory metal catalytic dissociation of fullerene molecules on the surface of a metal assembly, followed by carbon diffusion into the bulk is observed in a temperature range of 800–1000 K RN Gall et al, "Using $C_{60}$ Molecules for Deep Carbonization of Rhenium in Ultrahigh Vacuum", Tech. Phy. Lett. 23 (12): 911–912, 1997; Z. Vakar et al., "Growth of crystallites consisting of $C_{60}$ molecules on heated (100) Mo", JETP Letters. 67 (12): 1024–1028, 1998).

Returning to FIGS. 2–3 , in various exemplary embodiments of the present invention, acceleration electrode 46 is emplaced in front of duct 58. The body of acceleration electrode 46 comprises a centered orifice through which the beam emanates. The orifice is coaxial with the optical axis of the beam, and the central axis of duct 58 (dash-dot line on the FIG. 3).

In various exemplary embodiments of the present invention, apparatus 34 further comprises a protection electrode 44 defining a protected region 45. Protection electrode 44 serves for preventing the emitted electrons from escaping region 45 and penetrating into the regions of acceleration electrode 46 and grounded construction elements 54. Additionally, protection electrode 44 acts as a heat shield. Similar to acceleration electrode 46, protection electrode 44 is emplaced in front of duct 58. The body of protection electrode 44 also comprises a centered orifice through which the beam emanates. Further, the orifice of protection electrode 44 is coaxial with the optical axis of the beam, and the central axis of duct 58.

The heating of inner surface 61 can be achieved in more than one way. Hence, in one preferred embodiment, heating element 36 comprises a rhenium ribbon, wrapped around walls 60 and connected to a, preferably D.C., power supply. Therefore, according to the presently preferred embodiment of the invention inner surface 61 is heated by resistive heating of the ribbon. Inner surface 61 is heated up to 1200–1750 K. Heating element 36 is maintained at a negative electrical potential relative to the electrical potential of acceleration electrode 46. This negative electrical potential accelerates the anionic beam emanated from duct 58.

Figure 5:
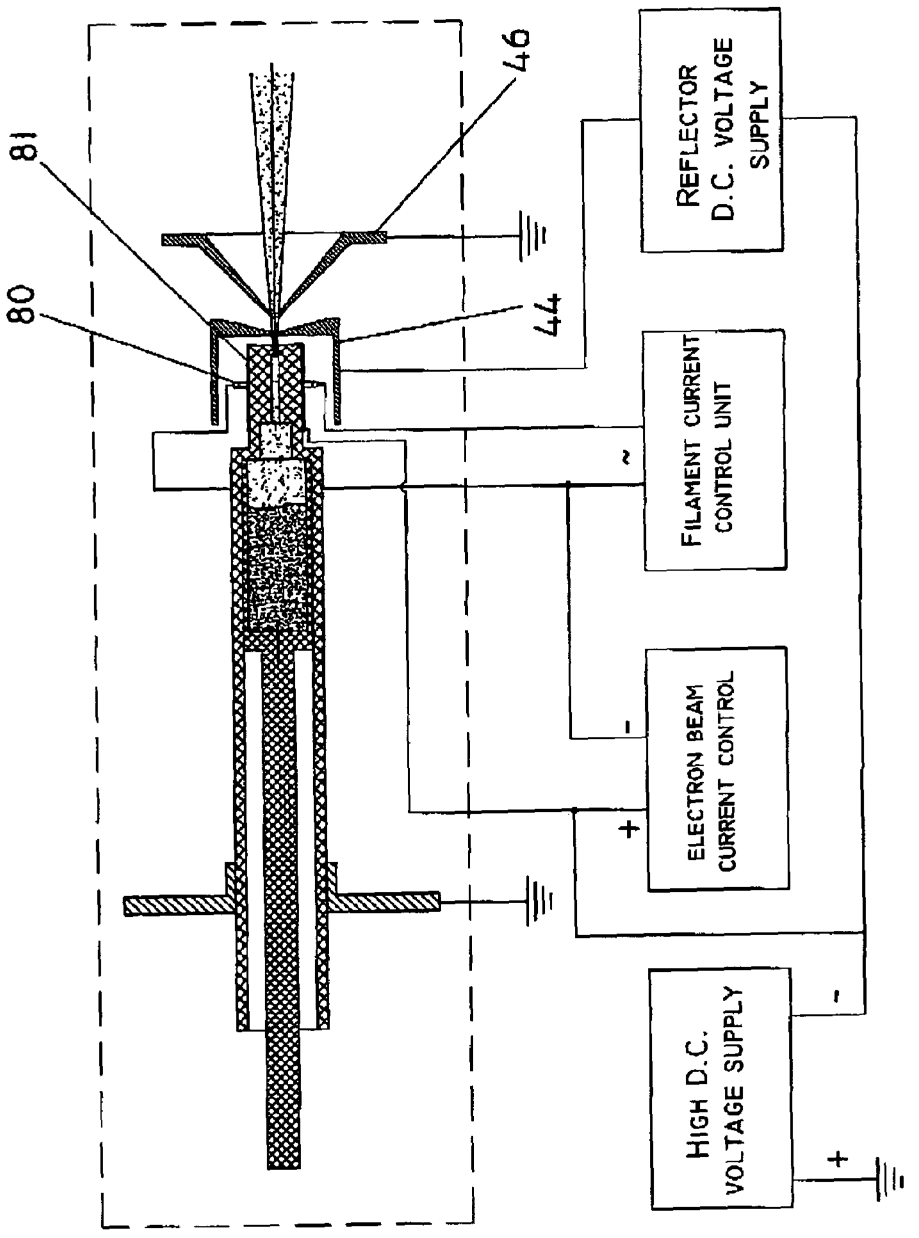
FIG. 5 is a schematic illustration of an ion source employing a method of electron bombardment, according to various exemplary embodiments of the present invention.
Figure 6:
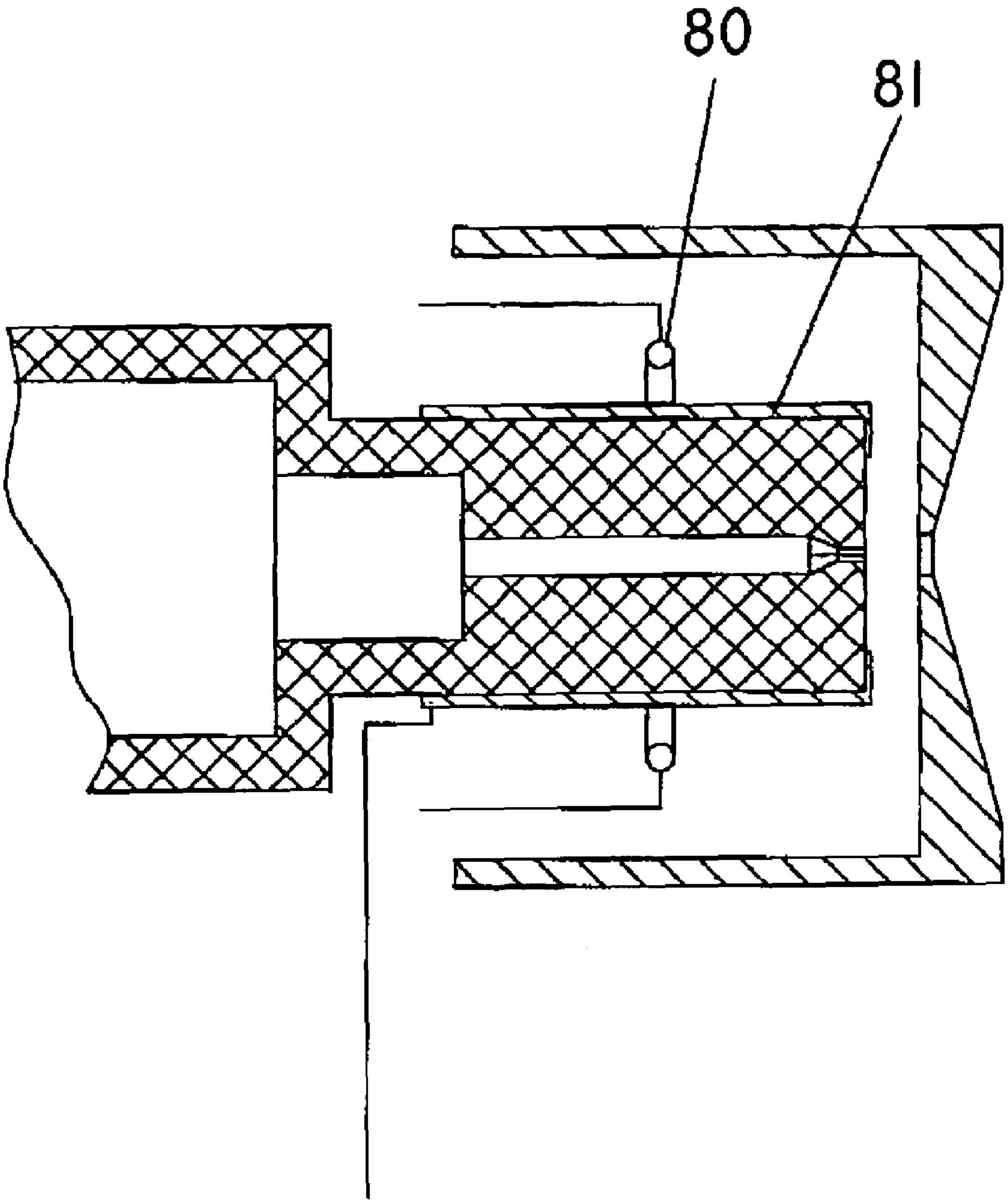
FIG. 6. is a schematic illustration of a cross-sectional view of the ion source of FIG. 5, according to various exemplary embodiments of the present invention.

In another preferred embodiment, the heating is by electron bombardment, as further detailed hereinbelow with reference to FIGS. 5 and 6.

Hence, in this embodiment heating element 36 comprises a heat-conductive body 81, preferably fitted to the external surface of walls 60, and an electron source 80. Heat-conductive body 81 can be, for example, a thin wall cylinder, which is preferably made of a refractory metal, such as, but not limited to, tungsten, molybdenum, rhenium, hafnium, tantalum, or refractory metal alloys, including, without limitation molybdenum-rhenium, tungsten-rhenium, tantalum-rhenium. Electron source 80 can be, for example, a roundly shaped filament (e.g., a ring, spiral, etc.) wrapped around heat-conductive body 81. Electron source 80 is connected to a, preferably D.C., power supply and heated up to its characteristic electron emission temperature. Electron source 80 is preferably maintained at a large negative electrical potential with respect to the potential of heat-conductive body 81.

In operation, electrons emitted from electron source 80 are accelerated by an electric field generated by the potential difference between electron source 80 and heat-conductive body 81. The accelerated electrons bombard the surface of electron source 81 thus transferring energy thereto. Consequently, the temperature of heat-conductive body 81 is increased and heat is transferred through wall 60 to inner surface 61. According to the presently preferred embodiment of the invention electron source 81 is maintained at a negative electrical potential relative to the electrical potential of accelerator electrode 46. The potential difference between electron source 81 and electrode 46 thus accelerates the anionic beam emanated from duct 58.

The negatively charged particles in the generated beam of the present invention may comprise anions as well as detached free electrons and electron emitted by heating element 36.

Protection electrode 44 is maintained at a small negative electrical potential with respect to the potential of heating element 36 by a D.C. power supply. The potential of protection electrode 44 prevents ingress of electrons emitted from heating element 36 to acceleration electrode 46 and construction elements 54. Therefore, protection electrode 44 reduces the current load on the power supply. In various exemplary embodiments of the present invention, protection electrode 44 is maintained at a negative potential of about 1–2 V with respect to the electrical potential of heating element 36.

In operation, according to various exemplary embodiments of the present invention, electrically neutral particles are placed into a replaceable ceramic container 42. Container 42 is thereafter inserted into apparatus 34 so that the electrically neutral particles may be evaporated by an oven 49. An assembly comprising apparatus 34 and container 42 is placed into a vacuum chamber 52. In various exemplary embodiments of the present invention, oven 49 is heated by resistive heating of a tantalum or rhenium wire 48 wrapped around the exterior ceramic body of oven 49.

The control and stabilization of the temperature of oven 49 are preferably provided by a thermocouple 50 in contact with the external wall of oven 49 and incorporated into a feed back loop of the current supply to oven 49. Typically, the temperature is maintained in the region of 700–950 K, depending on the required vapor pressure (about 0.1–0.5 Torr). In the preferred embodiment, the temperature is controlled to better than ±1 K.

In various exemplary embodiments of the invention, walls 60 and oven 49 are constructed of material with low thermoconductivity (such as, but not limited to, alumina) to provide thermal decoupling between oven 49 and walls 60. This thermal decoupling enables a constant flux mode throughout the temperature range of walls 60. Therefore, apparatus 34 enables independent control of the ion beam current level and internal (e.g., vibrational) energy of the molecular anions.

The electrically neutral particles may constitute a liquid, solid or gas. In solid form, the electrically neutral particles may constitute a powder.

Many types of electrically neutral particles are contemplated. Hence, in one embodiment, the electrically neutral particles comprise carbon particles, for example, $C_{60}$ molecules; in another embodiment, the electrically neutral particles comprise a mixture of fullerenes; and in an additional embodiment, the electrically neutral particles comprise an aggregate of different molecules.

The electrically neutral particles may exist in a gaseous form at room temperature. In this case, the particles arc selected, for example, from a group consisting of $SF_6$, $CFCl_3$, $WF_6$, F, Cl, and perhalogenated carbon compounds.

Figure 7:
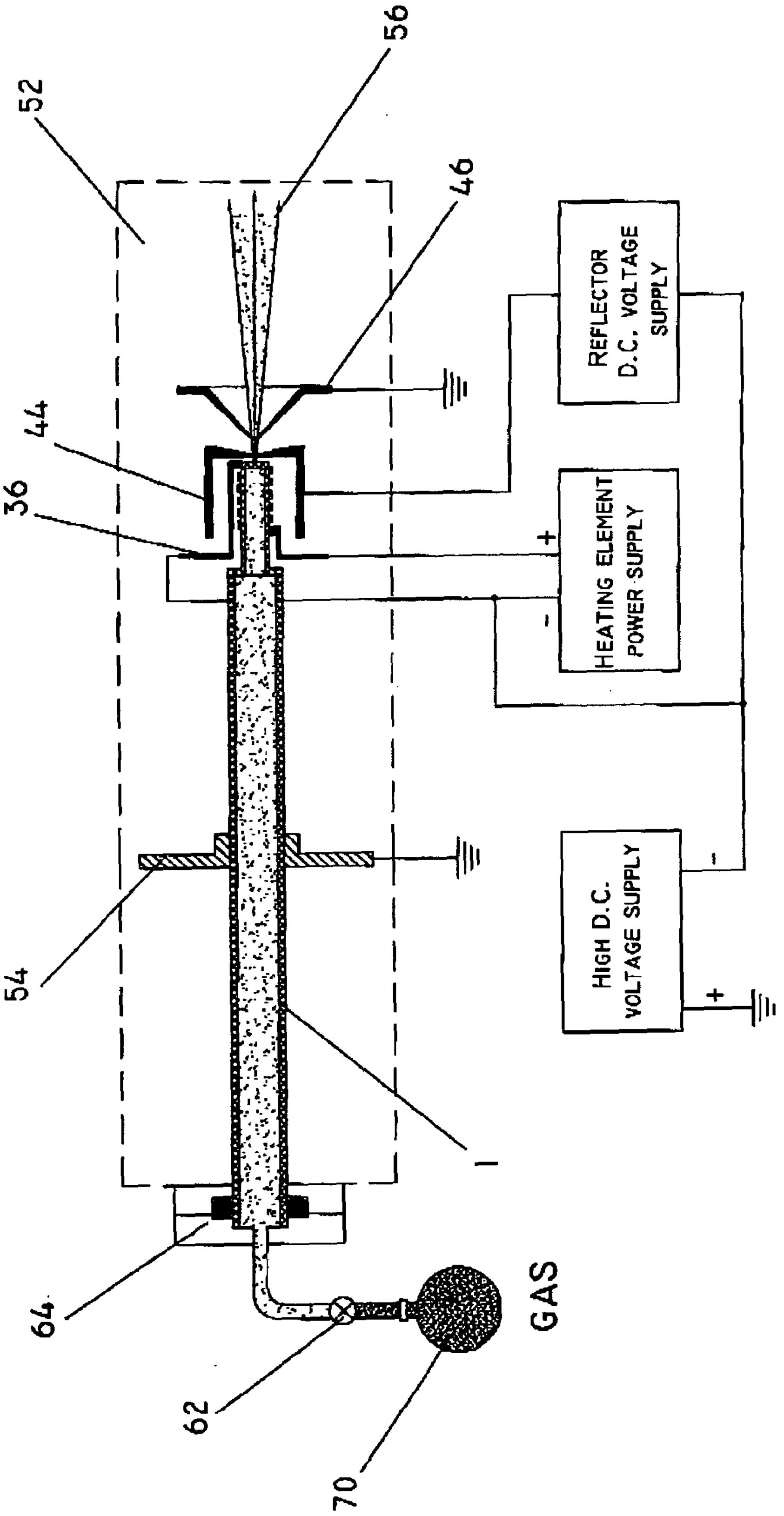
FIG. 7 is a schematic illustration of a modification of the ion gun for use with a gaseous supply of neutral particles, according to various exemplary embodiments of the invention.

Reference is now made to FIG. 7, which is an illustration of a modification of apparatus 34 for use with a gaseous supply of neutral particles according to various exemplary embodiments of the present invention. As is shown in FIG. 7, a gas source may be connected via a seal flange 64 to apparatus 34. Neutral gas atoms or molecules are conveyed out of container 70 through a valve 62 into apparatus 34. Adjusting the pressure of the gas supply via valve 62 controls the ion beam current.

Pass through duct 58, the electrically neutral particles are being ionized by a process of low energy electron capture. The electrons are emitted from inner surface 61 of wall 60. In various exemplary embodiments of the invention, the material constituting walls 60 is characterized by a high resistivity at room temperature. In various exemplary embodiments of the present invention, the resistivity decreases by at least five orders of magnitude when the material is heated to approximately electron emission temperature. For example, at 1500 K, alumina becomes ten orders of magnitude more conductive than at room temperature. At these conditions, electron emission from inner surface 61 takes place.

The anionic particles are then extracted and accelerated by an electrostatic field generated by accelerator electrode 46.

In various exemplary embodiments of the present invention, the material constituting walls 60 is selected such that the coating of inner surface 61 with carbonaceous overlayer results in a decrease of the surface work function, to increase thermionic electron emission.

In various exemplary embodiments of the present invention, a facilitating agent is used to increase the efficiency of anion formation. In various exemplary embodiments of the present invention, the facilitating agent is an alkali metal vapor. The neutral molecules interact with the alkali atoms either in the gas phase or in a surface activation of inner surface 61, with or without intercalation.

Many facilitating agent can be used, including, without limitation $Cs_2CrO_4$ (cesium chromate) and $Cs_2CO_3$ (cesium carbonate). Cesium is preferred for use with anionic fullerene formation because cesium offers the lowest ionization potential as compared to other alkali metals. Cesium is also preferred for use because of other properties of this element: (i) under heating, cesium chromate provides desorption of only cesium atoms (without any impurities); (ii) an optimal vapor pressure of cesium (~0.1 torr) consistent with the optimal vaporization temperature of fullerene molecules is achieved in the temperature region 700–900 K; (iii) in the optimal temperature range, cesium chromate is inactive towards to fullerene, therefore providing a long working time for this mixture.

Figure 8:
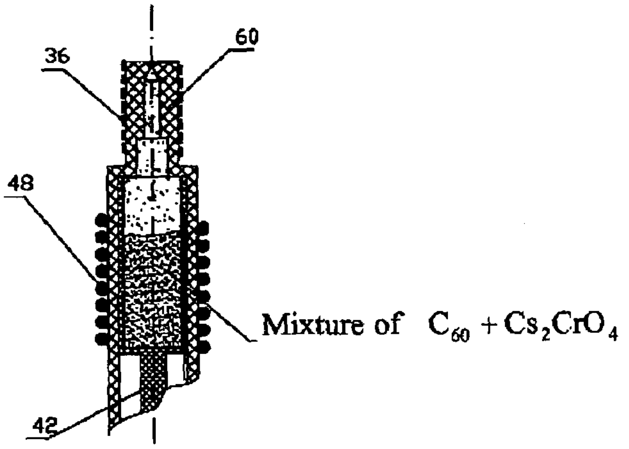
FIG. 8 is a schematic illustration of the use of a facilitating mixture added, according to various exemplary embodiments of the present invention.

Reference is now made to FIG. 8, which illustrates an example of using a facilitating mixture 40 according to various exemplary embodiments of the present invention. In the preferred embodiment, mixture 40 of pure $C_{60}$ powder and cesium chromate in weight proportions of 80% $C_{60}$+ 20% $Cs_2CrO_4$ is placed inside crucible 42. Crucible 42 is then placed into apparatus 34.

Figure 9:
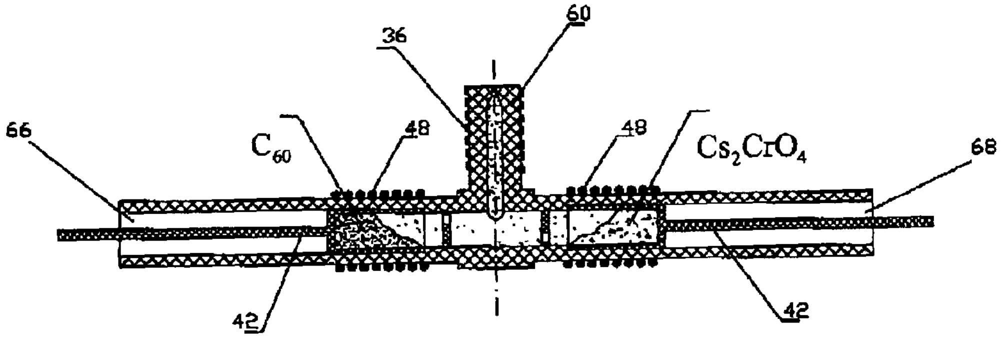
FIG. 9 is a schematic illustration of a cross-sectional view of an alternate exemplary embodiment of the ion source according to the present invention.
Figure 10:
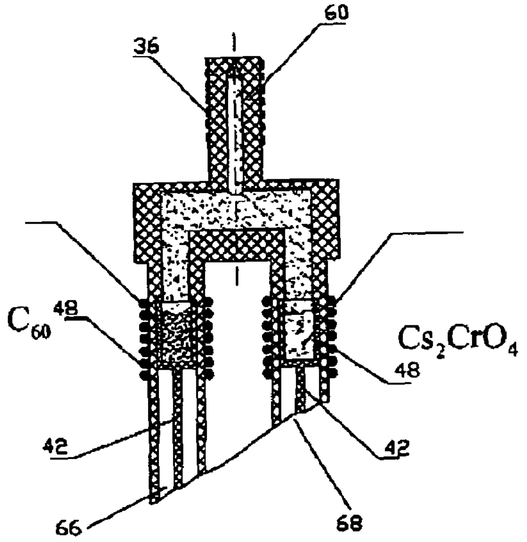
FIG. 10 is a schematic illustration of a cross-sectional view of an alternate exemplary embodiment of the ion source according to the present invention.

Reference is now made to FIGS. 9 and 10, which illustrate cross-sectional views of alternate exemplary embodiments of the ion source according to the present invention. In the embodiments illustrated by FIGS. 9 and 10, apparatus 34 further comprises a first ingress port 66 and a second ingress port 68 into duct 58. First port 66 enables neutral particles to be passed through to duct 58. Second port 68 enables a facilitator agent vapors to be passed through to duct 58. Therefore, the individual flow rates of the neutral particles and the facilitator agent vapors through duct 58 are separately controllable by adjusting the vapor pressure of each gas. This configuration enables more efficient control of the anionic beam current.

In various exemplary embodiments of the present invention as illustrated by FIGS. 9 and 10, fullerene powder and an activator ($Cs_2CrO_4$) are placed into individual crucibles 42 and heated by independent heaters 48. The evaporated neutral fullerene molecules enter duct 58 via first ingress port 66. Similarly, the evaporated activator enters duct 58 via second ingress port 68. According to a preferred embodiment of the present invention, crucibles 42 are operative to maintain the appropriate thermodynamic conditions for allowing the aforementioned evaporation of fullerene powder. Representative examples of the thermodynamic conditions of crucibles 42 include, without limitation temperature of about 700 to 1000 K and pressure of from about 0.001 to about 0.5 torr.

As stated with reference to the preceding figures, apparatus 34 may also be used to generate a neutral particulate beam. In this process, at least a portion of the negatively charged particles (post-acceleration) comprising the anionic beam undergoes electron autodetachment so as to generate an energetic neutral particulate beam.

In various exemplary embodiments of the present invention, a plurality of neutral fullerene molecules are generated after traversing duct 58. Under 0.1 torr vapor pressure, fullerene molecules have a mean free path of less than the diameter of channel 59. For lower vapor pressure (under 0.1 torr), the fullerene molecules spend approximately 0.8 millisecond inside channel 59. This time is sufficient for the fullerene molecules to achieve translational and vibrational thermal equilibration because of the multiple (approximately 300–400) collisions of the molecules with inner surface 61 and with other molecules.

Under these conditions, the excitation of fullerene molecules is purely thermal and the vibrational energy distribution at time zero (defined to be immediately following effusion from the orifice 58) is canonical with the thermal bath temperature T (nozzle temperature). The relationship between the temperature T of a canonical molecular ensemble and the average vibrational energy $\overline{E}_v$ of a neutral fullerene molecule from this ensemble is defined in the following equation [E Kolodney e al., "Activated Processes of Iisolated Superhot $C_{60}$ in Molecular Beams," Fullerene Sci. and Tech. 6(1): 67–102, 1998]:

$$\overline{E}_v(T) = \begin{cases} 7.47 + 0.01340(T - 1000) & 1500\,K > T > 1000\,K \\ 14.17 + 0.01448(T - 1500) & 4000\,K > T > 1500\,K, \end{cases}$$

where $\overline{E}_v$ is given in [eV] and T in [K] units. Anionic fullerene molecules effused from duct 58 have a minimal vibrational energy equal the sum of $\overline{E}_v$ and energy EA acquired due to the capture of an extra electron (EA=2.65 eV—electron affinity of $C_{60}$ molecule). Therefore, for nozzle temperatures in the range of 1200–2000 K, the vibrational energies of fullerene ions lie in the range of 12–21 eV. Such molecular anions have long-lived metastable states and therefore the auto-detachment of electrons along all paths of the anions into the ion optical system takes place. As a result, an energetic beam of neutral molecules is generated.

The rate of auto-detachment of thermally excited $C_{60}^-$ is described by the Arrhenius equation:

$$k(T) = A \cdot \exp\left(-\frac{E_a}{KT}\right),$$

where the pre-exponential factor $A=1.3\times10^{11}$ sec.$^{-1}$ and the activation energy $E_a$=EA=2.65 eV. It is clear that the flux of neutral fullerene molecules is controlled over a wide range by variation of the nozzle temperature.

Figure 11:
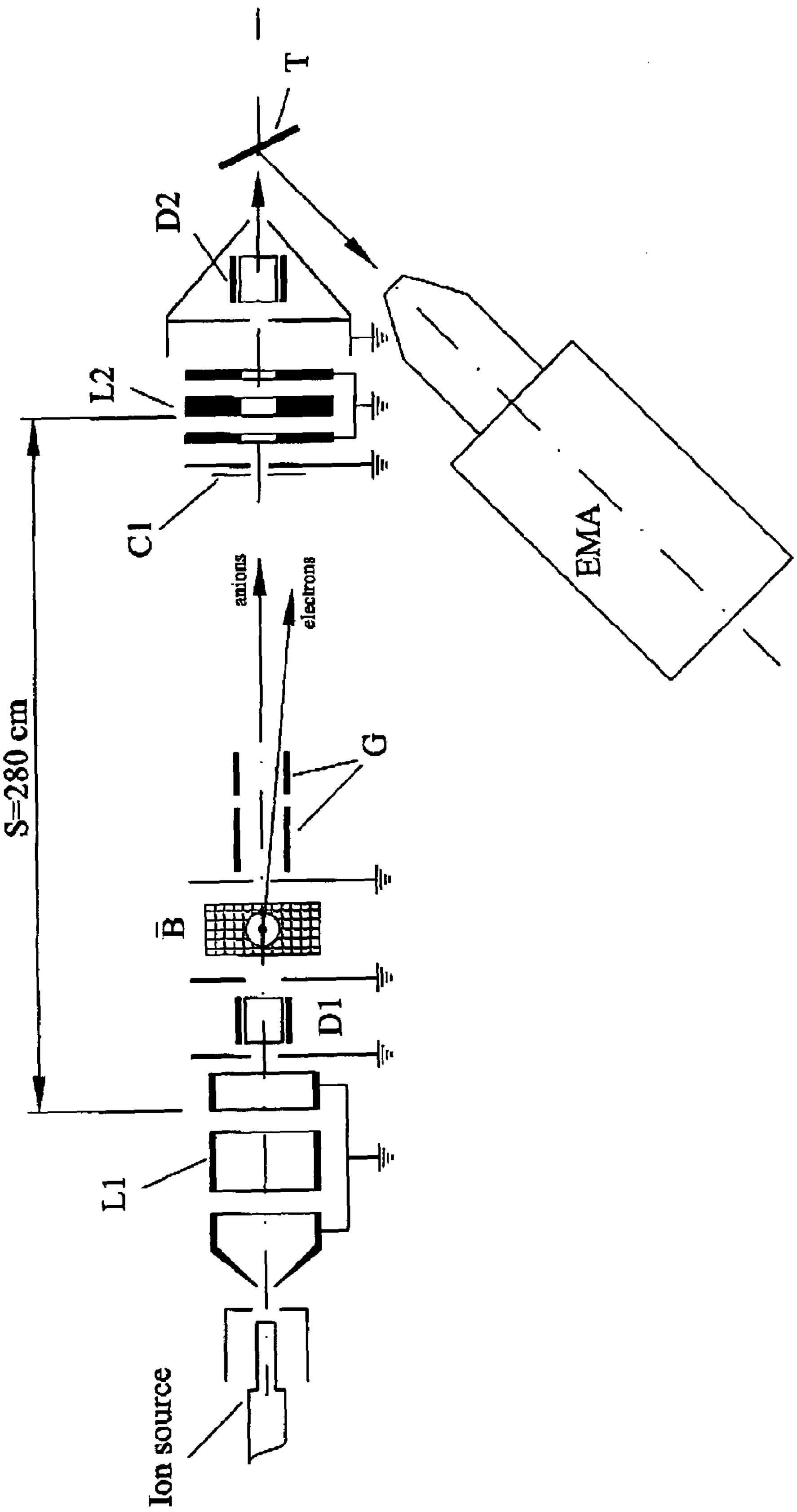
FIG. 11 is an illustration of an experimental configuration for the detection of neutral fullerene molecules in accordance with various exemplary embodiments of the present invention.

One example of the use of a neutral particulate beam is in the field of chemical analysis. Reference is now made to FIG. 11, in which a schematic view of an experimental configuration of the anionic and neutral particles source is presented. The system was used for the detection of neutral molecules. In various exemplary embodiments of the present invention, apparatus 34 of FIG. 8 comprises one or more einzel lenses L1 and L2 to focus the anionic beam. A magnetic field, B, is preferably applied to deflect detached electrons from the anion beam axis. In various exemplary embodiments of the present invention, apparatus 34 comprises one or more gating electrodes G for pulsed beam mode operation. In various exemplary embodiments of the present invention, apparatus 34 comprises deflector plates D2 for raster scanning the anionic beam onto a surface. In various exemplary embodiments of the present invention, apparatus 34 further comprises intermediate correction plates D1 and intermediate current collector C1.

In the apparatus of FIG. 11, neutral fullerene molecules are created in the field free space having length of S=280 mm and lying in the space between first L1 and second L2 focusing lenses. Operating the intermediate electrode of einzel lens L2 with retarding potential at 15–20% more then the accelerating potential deflects negative fullerene ions. Surface Induced Dissociation (SID) was used for detection of the neutral beam. In this method, accelerated neutral or negatively charged fullerene molecules collide with the surface of a solid target T (gold polycrystalline in the present experiment). Under impact, small $C_n^-$ cluster anions (n=2–28) are effectively generated by the multifragmentation process of the surface scattered fullerenes. [A. Bekkerman et al., "Above the surface multifragmentation of surface scattered fullerenes". J. Chem. Phys. Vol. 120 No 23 11026–11030 (2004)]. The probability of formation of these negatively charged fragments does not depend on the charge state of the incident molecule (neutral or negative) [A. Bekkerman et al., "Thermally Activated Decay Channels of Superhot $C_{60}^-$: Delayed Electron Emission and Dissociative Attachment Studied by Hypethermal Negative Surface Ionization", Int. J. of Mass Spec. 185/186/187: 773–786, 1999]. This feature enables the measurement of the relative fluxes of both beam components (neutral and ionic).

The substances ejected from the surface are detected with an anionic fragment detector. In various exemplary embodiments of the present invention, an energy-mass analyzer (EMA) is used. The detector uses wide energy windows for detection of these fragment anions.

Figure 12:
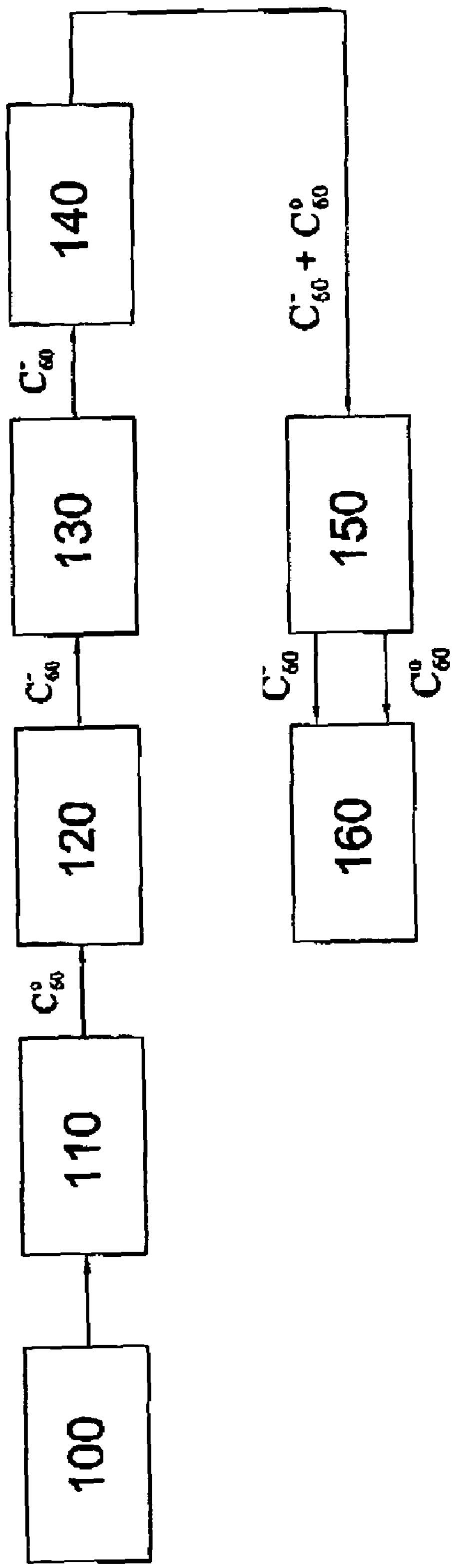
FIG. 12 is a flowchart illustrating a method of generating an anionic beam in accord with various exemplary embodiments of the present invention.

Reference is now made to FIG. 12, which is a flowchart illustrating a method for generating an anionic beam in accord with various exemplary embodiments of the present invention. As is shown in FIG. 12, the method begins at step 100, and continues to step 110, in which electrically neutral particles are passed through a duct defined by walls having an inner surface. The method continues at step 120, in which the inner surface is heated to a temperature above its emission temperature. The process at step 120 occurs in a simultaneous fashion with the process at step 110. As a result of the process of step 120, the neutral particles become negatively charged. The negatively charged particles of step 120 are ion-optically controlled and manipulated into an anion beam at step 130. According to a preferred embodiment of the present invention, the method continues at step 140 in which the energetic neutral particles are generated in field free space by the process of electron detachment of anions. The method preferably continues at step 150, in which electrically charged and neutral particles are separated. Finally, at step 160, the method ends.

In various exemplary embodiments of the present invention, the method farther comprises the step of passing a facilitating agent through the duct in a simultaneous fashion with the passing of the electrically neutral particles through the duct so as to enhance the yield of the negatively charged particles. In various exemplary embodiments of the present invention, the method further comprises an additional step in which electrons emitted from the heating element and detached electrons are deflected from an axis characterizing the anion beam, for example, by applying a magnet field.

As stated, in various exemplary embodiments of the present invention, at least a portion of the negatively charged particles generated as a result of step 120 undergoes electron autodetachment; resulting in an energetic neutral particulate beam. In various exemplary embodiments of the present invention, the anion beam generated as a result of the processes of step 130 is redirected so that an axis characterizing the redirected anion beam is displaced angularly from an axis characterizing the neutral beam.

In various exemplary embodiments of the present invention, the method further comprises raster scanning the anionic beam onto a surface for analysis. In various exemplary embodiments of the present invention, the method further comprises analyzing a plurality of species emitted from the surface as a result of the interaction of the scanning anion beam with the surface so as to determine its chemical composition.

In various exemplary embodiments of the present invention, the anion beam of step 130 may be used for any application in the following non-exhaustive list: atomic physics, molecular physics, plasma physics, thin film deposition, surface etching, ion implantation, submicron lithography, nano-electro-mechanical system construction, nano-photonic system construction, new material synthesis, and electric propulsion devices, such as, but not limited to, ion engines for micro-satellites. In various exemplary embodiments of the present invention, either the anionic beam or the neutral particulate beam may be used for any application in the following non-exhaustive list: surface chemistry and catalysis, organic chemistry, biology, pharmacology and biotechnology.

Additional objects, advantages, and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

EXAMPLES

Reference is now made to the following examples, which together with the above descriptions, illustrate the invention in a non-limiting fashion.

Figure 13:
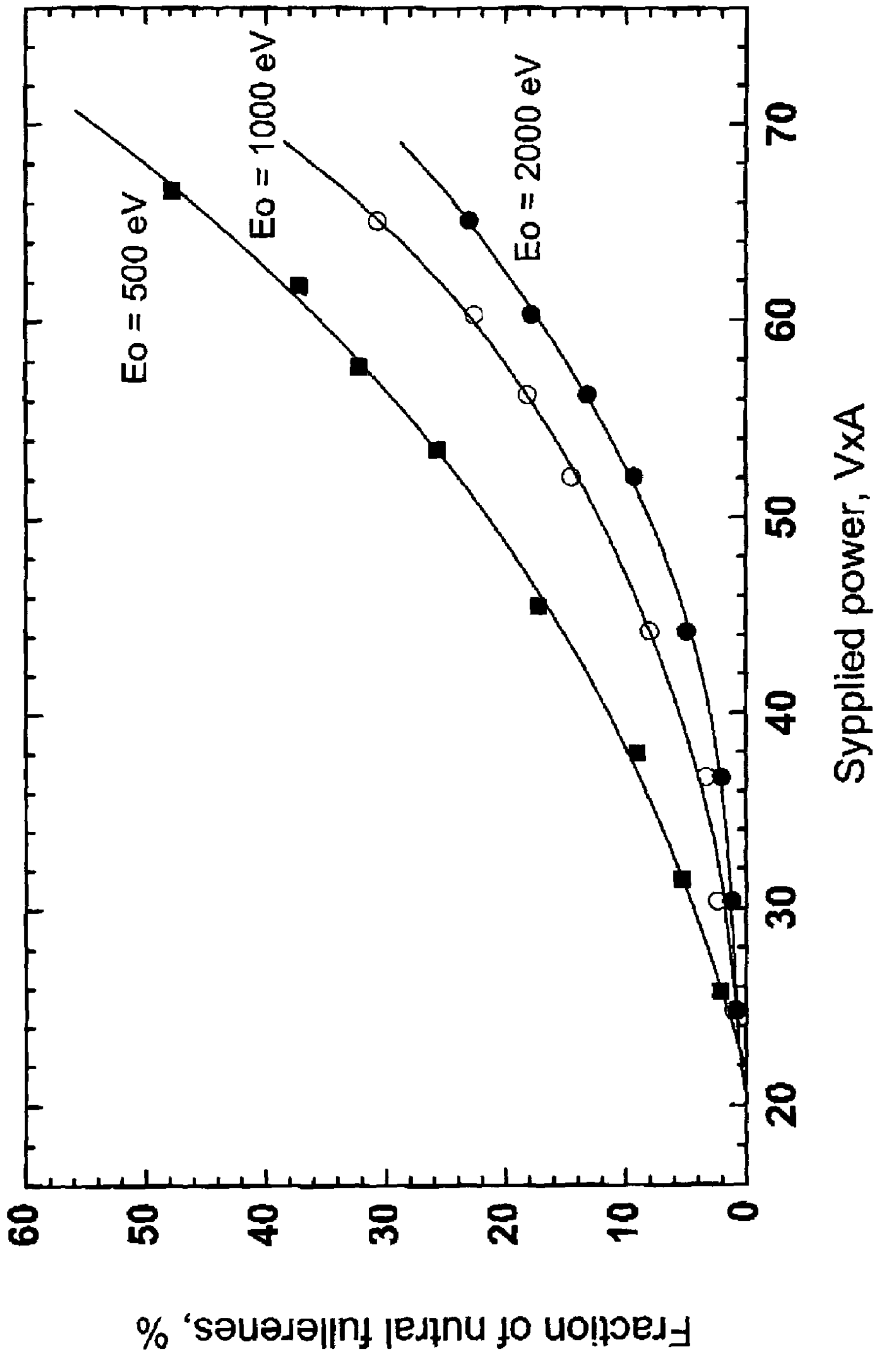
FIG. 13 is a graph illustrating a function relating the fraction of neutral fullerene molecules in total flux to source power and energy of the ion beam.

Reference is now made to FIG. 13, illustrating the relationship of the fraction of neutral fullerene molecules in total flux to the source power and energy of the ion beam, as measured by the system of FIG. 11. The total flux is defined to be the sum of neutral and negative charged molecules. As is illustrated in FIG. 13, the fraction of neutral fullerene molecules in the total flux depends both on the heating power applied to walls 60 (VxA) and on the beam energy ($E_o$). $E_o$ dependence is attributable to the difference in flight time of the fullerene molecules through the field free region A.

Figure 14:
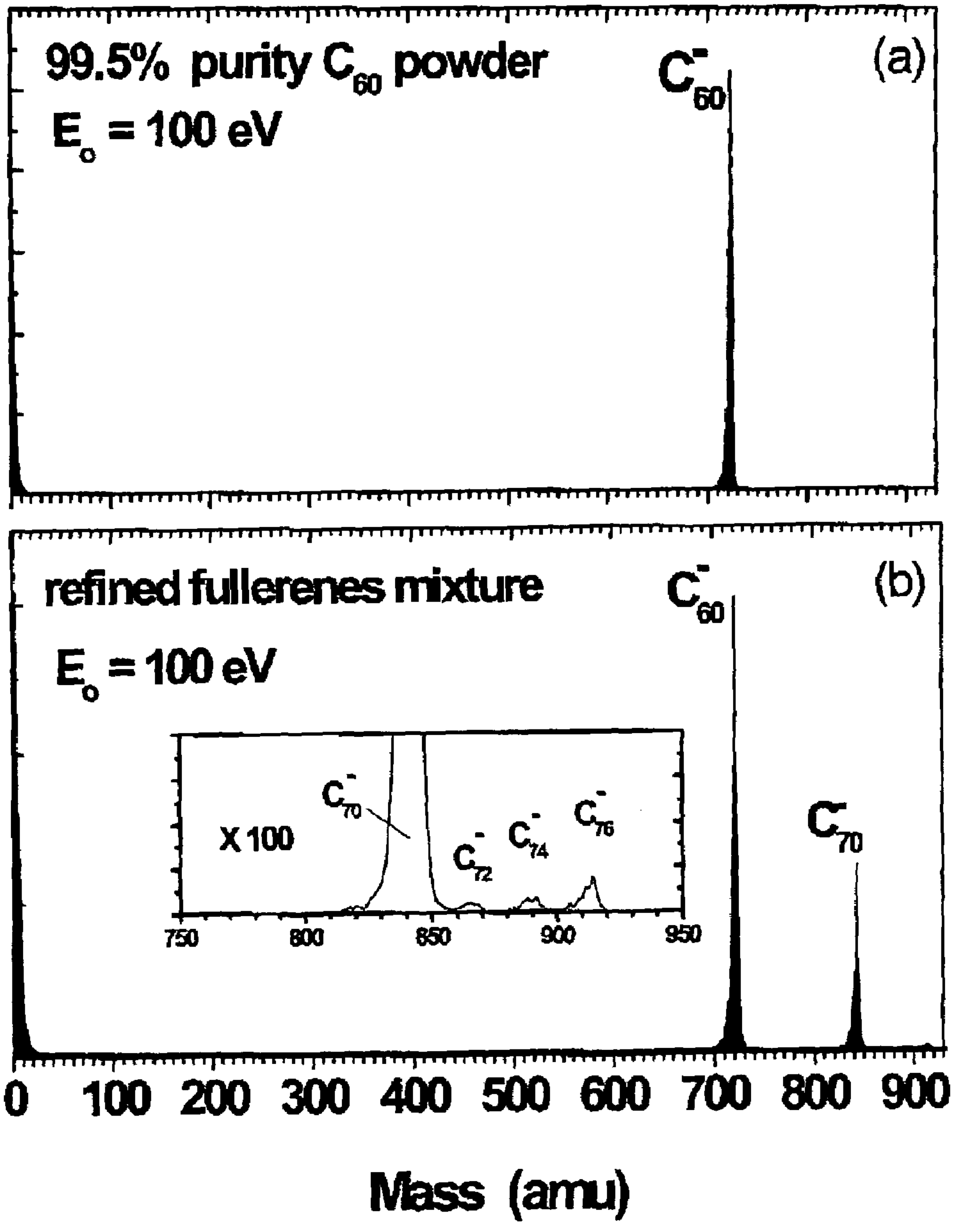
FIG. 14A illustrates the mass spectrum of the negative fullerene ion beams for purified $C_{60}$ powder (99.5%).
FIG. 14B illustrates the mass spectrum of the negative fullerene ion beams for a refined fullerene mixture.

Reference is now made to FIGS. 14*a*–14*b*, in which the mass spectra of anionic fullerene beams, characterized by an $E_o$=100 eV, are illustrated. The spectra are measured by a quadrupole mass-spectrometer. FIG. 14*a* illustrates the mass spectra of an anionic fullerene beam generated from purified $C_{60}$ powder (99.5%). In FIG. 14*b*, the mass spectra of an anionic beam generated from a refined fullerene mixture is illustrated.

As is illustrated in FIGS. 14*a*–14*b*, the mass spectra of the anionic beam generated from pure $C_{60}$ powder is dominated by $C_{60}^-$ ions. For the fullerene mixture, the highest peaks are $C_{60}^-$ and $C_{70}^-$; however, larger fullerene ions $C_n^-$ (n=72, 74, 76) of very low intensity were also observed. The high stability of the fullerene molecules prevents unimolecular decomposition despite the high vibrational excitation of the anionic beam inside walls 60. In all cases only a negligible fraction ($<10^{-5}$) of smaller negatively charged fullerene ions $C_n^-$ (n=56, 58) is detected. Therefore, the fullerene ion source in the present invention needs no any mass filter for cleaning ion beam.

Figure 15:
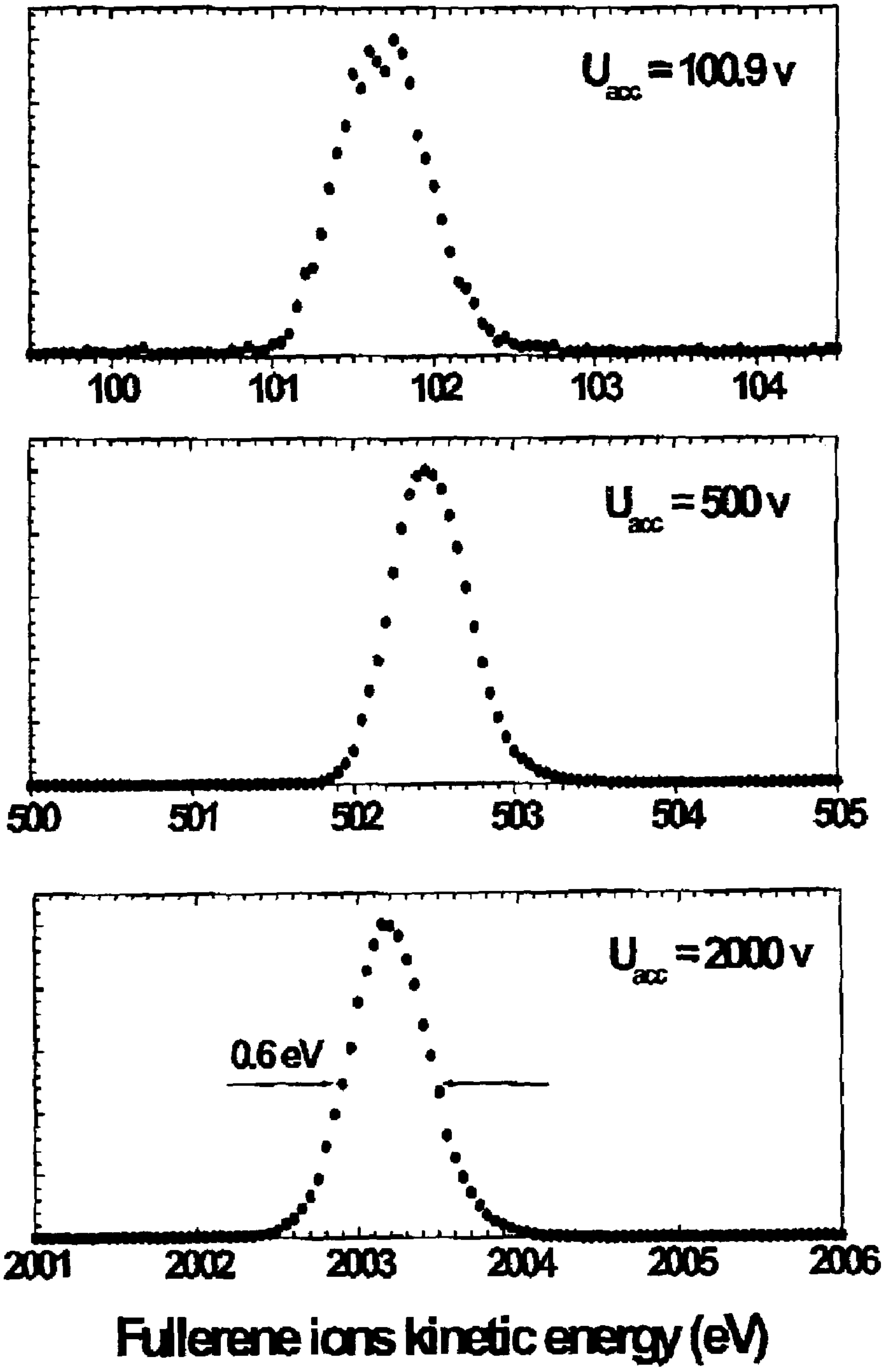
FIG. 15 illustrates the energy spectrum of the $C_{60}^{-}$ negative ions produced by the ion source.

The energy spread is one of the most important parameters of an ion beam. The energy spread affects the extraction efficiency of the ions, the current density, homogeneity and focusing quality of the beam. FIG. 15 illustrates the energy spectrum of an anionic fullerene beam measured by an EMA for three acceleration voltages ($U_{acc}$32 100.9, 500 and 2000 eV). In each spectra graph, the Full Width at Half Maximum (FWHM) of the kinetic energy distribution is quite narrow. The energy spectrum for $U_{acc}$ =2000 eV is limited by the instrumental width (0.5–0.6 eV) of the energy analyzer.

Detailed measurements of different energy spectra indicate that the energy spread of the anions is nearly independent of the acceleration potential. This energy spectrum is evidence that the fullerene anions are generated in the internal volume of walls 60 rather than in the space between walls 60 and acceleration electrode 46. Additionally, for all measurements the kinetic energy of the fullerene anions exceeds the $U_{acc}$ values by 1–4 eV, depending on the acceleration voltage. This shift probably relates to slight surface charging of the ceramic emitter.

Figure 16:
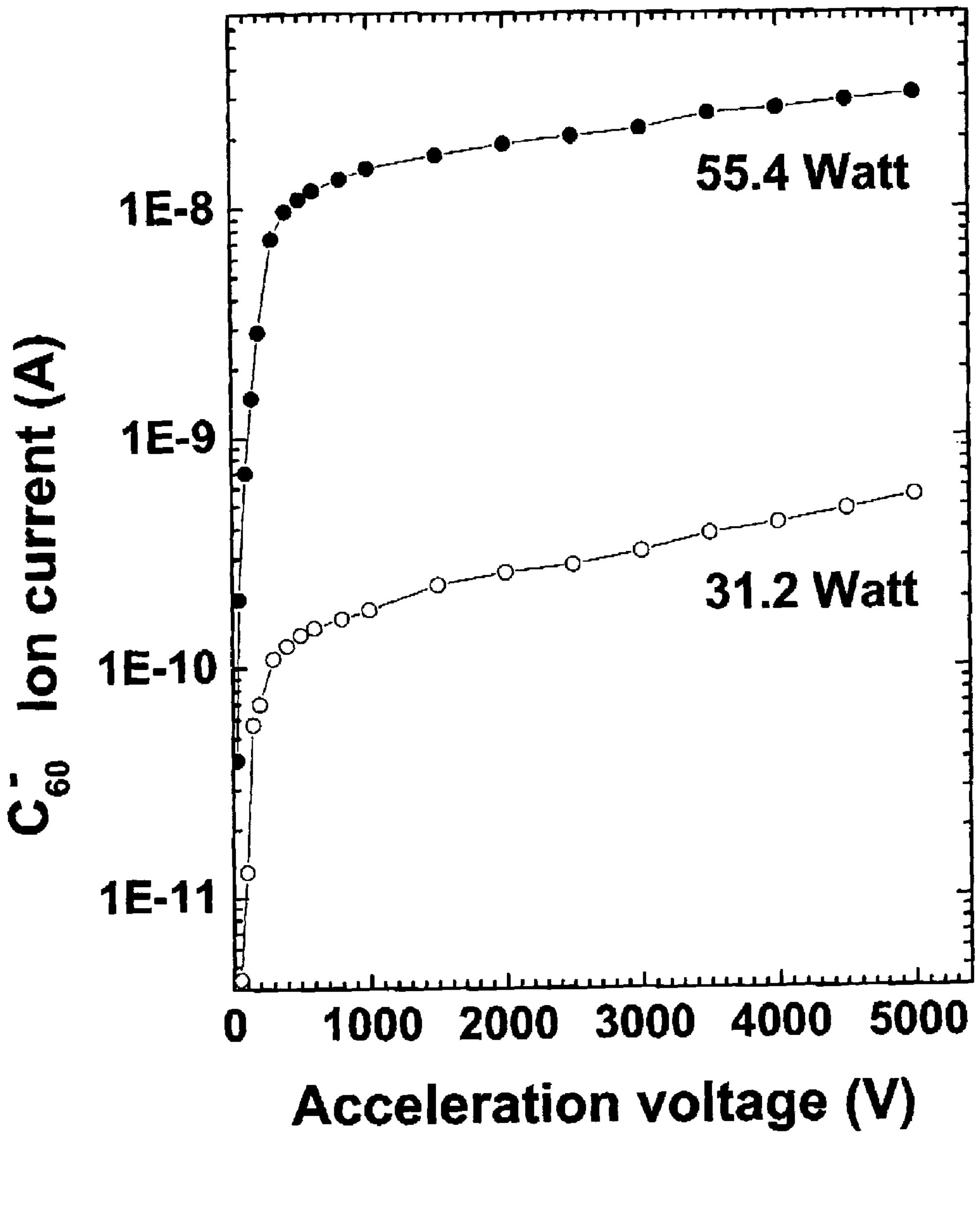
FIG. 16 is a graph illustrating the $C_{\alpha}^{-}$ negative ion current as a function of the acceleration voltage, $U_{acc}$.

Reference is now made to FIG. 16, which illustrates the fullerene anion current as a function of the acceleration voltage applied between walls 60 and acceleration electrode 46. Measurements are presented for two different values of the heating power P (total power consumed by heating element 36 and oven 48) supplied to the source. As the graphs of FIG. 16 indicate, ion current may be controlled in a very wide range by controlling the power P applied to heating element 36.

The apparatus, system, and method of anionic beam generation and analysis and any apparatus, device and/or system which employs any embodiment of the apparatus described above may be employed on many objects which are to be imaged and/or otherwise analyzed.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. An apparatus for generating an anion beam, comprising a duct defined by walls having an inner surface capable of sustaining a temperature above an electron emission temperature of said inner surface, so as to negatively charge electrically neutral particles being passed through said duct when said inner surface is heated to said temperature above said electron emission temperature; a heating element for heating said inner surface to said temperature above said electron emission temperature; and an acceleration electrode for ion-optically controlling and manipulating the negatively charged particles into the anion beam.

2. The apparatus of claim 1, wherein said walls comprise a material characterized by a maximum service temperature of 2000 K.

3. The apparatus of claim 1, wherein said walls comprise a material characterized by a minimum service temperature of 1200 K.

4. The apparatus of claim 1, wherein said walls comprise a material characterized by a melting point above 2200 K.

5. The apparatus of claim 1, wherein said walls comprise a material characterized by a high resistivity al room temperature, said resistivity decreasing by at least five orders of magnitude when said material is heated to approximately electron emission temperature.

6. The apparatus of claim 1, wherein said walls comprise a material is characterized by chemical inertness up to a maximum service temperature of said walls.

7. The apparatus of claim 1, wherein said walls comprise a material selected a group consisting of metal oxide, graphite and boron-nitride ceramic.

8. The apparatus of claim 7, wherein said metal oxide is selected from the group consisting of aluminum oxide and zirconium oxide.

9. The apparatus of claim 7, wherein said material comprises alumina.

10. The apparatus of claim 7, wherein said material is a source of electrons.

11. The apparatus of claim 10, wherein said material is selected such that a residue generated from said electrically neutral particles activates said material so as to increase said electron emission.

12. The apparatus of claim 10, wherein said material is selected such that a facilitating agent activates said material so as to increase said electron emission.

13. The apparatus of claim 12, wherein said facilitating agent is selected from the group consisting of $Cs_2CrO_4$ and $Cs_2CO_3$.

14. The apparatus of claim 1, wherein a diameter of said duct is in the range 50 microns to 300 microns.

15. The apparatus of claim 1, wherein a diameter of said duct is in the range of 100 microns to 160 microns.

16. The apparatus of claim 1, wherein said electrically neutral particles comprise carbon particles.

17. The apparatus of claim 16, wherein said electrically neutral particles comprise $C_{60}$ molecules.

18. The apparatus of claim 1, wherein said electrically neutral particles comprise an aggregate of different molecules.

19. The apparatus of claim 18, wherein said electrically neutral particles comprise a mixture of fullerenes.

20. The apparatus of claim 1, wherein said electrically neutral particles are selected from a group consisting of $I_2$, $SF_6$, $CFCl_3$, $WF_6$, F, Cl, and perhallogenated carbon compounds.

21. The apparatus of claim 1, wherein a body of said acceleration electrode comprises a centered orifice through which the anion beam emanates, said orifice being coaxial with an optical axis of the anion beam, and a central axis of said duct.

22. The apparatus of claim 1, further comprising a protection electrode defining a protected region, for substantially preventing emitted electrons from escaping said protected region.

23. The apparatus of claim 22, wherein a body of said protection electrode comprises a centered orifice through which the anion beam emanates, said orifice being coaxial with an optical axis of the anion beam, and a center of said duct.

24. The apparatus of claim 22, wherein said heating element is at a first electrical potential, and said protection electrode is at a second electrical potential, the first electrical potential being positive with respect to the second electrical potential.

25. The apparatus of claim 22, wherein said heating element is at a first electrical potential, and said protection electrode is at a second electrical potential, the first electrical potential being negative with respect to the second electrical potential.

26. The apparatus of claim 1, wherein said heating element comprises a rhenium ribbon, said ribbon wrapped around said walls, said ribbon electrically connected to a power supply.

27. The apparatus of claim 1, wherein said heating element comprises a heat-conductive body, kept at an electrical potential difference from an electron source, said heat-conductive body and said electron source being designed and constructed such that electrons, emitted by said electron source, accelerate in said electrical potential difference and bombard said heat-conductive body to thereby heat said heal-conductive body.

28. The apparatus of claim 1, wherein said heating element is at a first electrical potential, and said acceleration electrode is at a third electrical potential, the first electrical potential being negative with respect to the third electrical potential.

29. The apparatus of claim 1, further comprising one or more einzel lenses to focus the anionic beam.

30. The apparatus of claim 1, further comprising one or more gating electrodes for pulsed beam mode operation.

31. The apparatus of claim 1, further comprising deflector plates for raster scanning the anionic beam onto a surface.

32. The apparatus of claim 1, further comprising: a first ingress port and a second ingress port into said duct, wherein said first port enables the neutral particles to be passed through said duct and said second port enables a facilitator agent to be passed through said duct, and wherein a first flow rate of the neutral particles and a second flow rate of the facilitator agent through said duct arc separately controllable.

33. A system for analyzing substances ejected from a surface of a sample bombarded with an anion beam, comprising:

(a) an anion beam source, wherein said source comprises a duct defined by walls having an inner surface capable of sustaining a temperature above an electron emission temperature of said inner surface, so as to negatively charge electrically neutral particles being passed through said duct when said inner surface is heated to said temperature above said electron emission temperature; a heating element for heating said inner surface to said temperature above said electron emission temperature; and an acceleration electrode for ion-optically controlling and manipulating the negatively charged particles into the anion beam, such that when said anion beam bombards the surface, said anion beam displaces substances of the surface; and (b) a detector for detecting the substances once ejected of the surface.

34. The system of claim 33, wherein said detector is emplaced to receive the substances, and wherein the sample is situated so that a path followed by the substances is crosswise to a path of the anion beam.

35. The system of claim 34, wherein said detector comprises an energy-mass analyzer.

36. The system of claim 35, wherein said detector utilizes a wide energy window.

37. The system of claim 33, wherein said walls comprise a material characterized by a maximum service temperature of 2000 K.

38. The system of claim 33, wherein said walls comprise a material characterized by a minimum service temperature of 1200 K.

39. The system of claim 33, wherein said walls comprise a material characterized by a melting point above 2200 K.

40. The system of claim 33, wherein said walls comprise a material characterized by a high resistivity at room temperature, said resistivity decreasing by at least five orders of magnitude when said material is heated to approximately electron emission temperature.

41. The system of claim 33, wherein said walls comprise a material is characterized by chemical inertness up to a maximum service temperature of said walls.

42. The system of claim 33, wherein said walls comprise a material selected a group consisting of metal oxide, graphite and boron-nitride ceramic.

43. The system of claim 42, wherein said metal oxide is selected from the group consisting of aluminum oxide and zirconium oxide.

44. The system of claim 42, wherein said material comprises alumina.

45. The system of claim 42, wherein said material is a source of electrons.

46. The system of claim 45, wherein said material is selected such that a residue generated from said electrically neutral particles activates said material so as to increase said electron emission.

47. The system of claim 45, wherein said material is selected such that a facilitating agent activates said material so as to increase said electron emission.

48. The system of claim 47, wherein said facilitating agent is selected from the group consisting of $Cs_2CrO_4$ and $Cs_2CO_3$.

49. The system of claim 33, wherein a diameter of said duct is in the range 50 microns to 300 microns.

50. The system of claim 33, wherein a diameter of said duct is in the range of 100 microns to 160 microns.

51. The system of claim 33, wherein said electrically neutral particles comprise carbon particles.

52. The system of claim 51, wherein said electrically neutral particles comprise $C_{60}$ molecules.

53. The system of claim 33, wherein said electrically neutral particles comprise an aggregate of different molecules.

54. The system of claim 53, wherein said electrically neutral particles comprise a mixture of fullerenes.

55. The system of claim 33, wherein said electrically neutral particles are selected from a group consisting of $I_2$, $SF_6$, $CFCl_3$, $WF_6$, F, Cl, and perhallogenated carbon compounds.

56. The system of claim 33, wherein a body of said acceleration elect-ode comprises a centered orifice through which the anion beam emanates, said orifice being coaxial with an optical axis of the anion beam, and a central axis of said duct.

57. The system of claim 33, wherein said anion beam source further comprises a protection electrode defining a protected region, for substantially preventing emitted electrons from escaping said protected region.

58. The system of claim 57, wherein a body of said protection electrode comprises a centered orifice through which the anion beam emanates, said orifice being coaxial with an optical axis of the anion beam, and a center of said duct.

59. The system of claim 57, wherein said heating element is at a first electrical potential, and said protection electrode is at a second electrical potential, the first electrical potential being positive with respect to the second electrical potential.

60. The system of claim 57, wherein said heating element is at a first electrical potential, and said protection electrode is at a second electrical potential, the first electrical potential being negative with respect to the second electrical potential.

61. The system of claim 33, wherein said heating element comprises a rhenium ribbon, said ribbon wrapped around said walls, said ribbon electrically connected to a power supply.

62. The system of claim 33, wherein said heating element comprises a heat-conductive body, kept at an electrical potential difference from an electron source, said heat-conductive body and said electron source being designed and constructed such that electrons, emitted by said electron source, accelerate in said electrical potential difference and bombard said heat-conductive body to thereby heat said heat-conductive body.

63. The system of claim 33, wherein said heating element is at a first electrical potential, and said acceleration electrode is at a third electrical potential, the first electrical potential being negative with respect to the third electrical potential.

64. The system of claim 33, wherein said anion beam source further comprises one or more einzel lenses to focus the anionic beam.

65. The system of claim 33, wherein said anion beam source further comprises one or more gating electrodes for pulsed beam mode operation.

66. The system of claim 33, wherein said anion beam source further comprises deflector plates for raster scanning the anionic beam onto a surface.

67. The system of claim 33, wherein said anion beam source further comprises: a first ingress port and a second ingress port into said duct, wherein said first port enables the neutral particles to be passed through said duct and said second port enables a facilitator agent to be passed through said duct, and wherein a first flow rate of the neutral particles and a second flow rate of the facilitator agent through said duct are separately controllable.

68. A method of generating an anion beam, comprising passing electrically neutral particles through a duct being defined by walls having an inner surface, while heating said inner surface to a temperature above an electron emission temperature of said inner surface, so as to negatively charge said particles, so as to obtain negatively charged particles; and ion-optically controlling and manipulating said negatively charged particles into the anion beam.

69. The method of claim 68, further comprising deflecting electrons from an axis characterizing the anion beam.

70. The method of claim 68, wherein said deflecting said electrons is by a magnetic field.

71. The method of claim 68, further comprising: passing a facilitating agent through said duct in a simultaneous fashion with said electrically neutral particles so as to enhance the yield of said negatively charged particles.

72. The method of claim 71, wherein said facilitating agent enhances the efficiency of said electron emission.

73. The method of claim 68, further comprising: raster scanning the anionic beam onto a surface for analysis.

74. The method of claim 73, further comprising: analyzing a plurality of fragments emitted from the surface as a result of said raster scanning so as to determine a chemical composition of the surface.

75. The method of claim 68, wherein the anion beam is used for an application selected from a group consisting of atomic physics, molecular physics, plasma physics, thin film deposition, surface etching, ion implantation, submicron lithography, nano-electro-mechanical system construction, nanophotonic system construction, new material synthesis, and electric propulsion devices.

76. The method of claim 68, wherein the anion beam is used for an application selected from a group consisting of surface chemistry and catalysis, organic chemistry, biology, pharmacology and biotechnology.

77. The method of claim 68, wherein said walls comprise a material characterized by a melting point above 2200 K.

78. The method of claim 68, wherein said walls comprise a material characterized by a high resisitivity at room temperature, said resistivity decreasing by at least five orders of magnitude when said material is heated to approximately electron emission temperature.

79. The method of claim 68, wherein said walls comprise a material selected a group consisting of metal oxide graphite and boron-nitride ceramic.

80. The method of claim 68, wherein said metal oxide is selected from the group consisting of aluminum oxide and zirconium oxide.

81. The apparatus of claim 79, wherein said material comprises alumina.

82. The apparatus of claim 79, wherein said material is a source of electrons.

83. The method of claim 71, wherein said facilitating agent is selected from the group consisting of $Cs_2CrO_4$ and $Cs_2CO_3$.

84. The method of claim 71, wherein a diameter of said duct is in the range 50 microns to 300 microns.

85. The method of claim 71, wherein a diameter of said duct is in the range of 100 microns to 160 microns.

86. The method of claim 68, wherein said electrically neutral particles comprise carbon particles.

87. The method of claim 86, wherein said electrically neutral particles comprise $C_{60}$ molecules.

88. The method of claim 68, wherein said electrically neutral particles comprise an aggregate of different molecules.

89. The method of claim 88, wherein said electrically neutral particles comprise a mixture of fullerenes.

90. The method of claim 68, wherein said electrically neutral particles are selected from a group consisting of $I_2$, $SF_6$, $CFCl_3$, $WF_6$, F, Cl, and perhallogenated carbon compounds.

91. The method of claim 68, wherein a body of said acceleration electrode comprises a centered orifice through which the anion beam emanates, said orifice being coaxial with an optical axis of the anion beam, and a central axis of said duct.

92. The method of claim 68, further comprising using a protection electrode defining a protected region, for substantially preventing emitted electrons from escaping said protected region.

93. The method of claim 92, wherein a body of said protection electrode comprises a centered orifice through which the anion beam emanates, said orifice being coaxial with an optical axis of the anion beam, and a center of said duct.

94. The method of claim 92, wherein said heating element is at a first electrical potential, and said protection electrode is at a second electrical potential the first electrical potential being positive with respect to the second electrical potential.

95. The method of claim 92, wherein said heating element is at a first electrical potential, and said protection electrode is at a second electrical potential, the first electrical potential being negative with respect to the second electrical potential.

96. The method of claim 68, wherein said heating is by a heating element having a rhenium ribbon, said ribbon wrapped around said walls, said ribbon electrically connected to a power supply.

97. The method of claim 68, wherein said heating is by a heating element having a heat-conductive body, kept at an electrical potential difference from an electron source, said heat-conductive body and said electron source being designed and constructed such that electrons, emitted by said electron source, accelerate in said electrical potential difference and bombard said heat-conductive body to thereby heat said heat-conductive body.

98. The method of claim 68, wherein said heating element is at a first electrical potential, and said acceleration electrode is at a third electrical potential, the first electrical potential being negative with respect to the third electrical potential.

99. The method of claim 68, further comprising using at least one einzel lens for focusing the anionic beam.

100. The method of claim 68, further comprising using at least one gating electrode for generating the anionic beam in a pulsed mode.

101. The method of claim 68, further comprising raster scanning the anionic beam onto a surface.

102. An apparatus for generating a neutral particulate beam, comprising a duct defined by walls having an inner surface capable of sustaining a temperature above an electron emission temperature of said inner surface, so as to negatively charge electrically neutral particles being passed through said duct when said inner surface is heated to said temperature above said electron emission temperature; a heating element for heating said inner surface to said temperature above said electron emission temperature; and an acceleration electrode for ion-optically controlling and manipulating the negatively charged particles into an anion beam, whereby at least a portion of said negatively charged particles undergo electron autodetachment so as to generate an energetic neutral particulate beam.

103. The apparatus of claim 102, wherein said walls comprise a material characterized by a maximum service temperature of 2000 K.

104. The apparatus of claim 102, wherein said walls comprise a material characterized by a minimum service temperature of 1200 K.

105. The apparatus of claim 102, wherein said walls comprise a material characterized by a melting point above 2200 K.

106. The apparatus of claim 102, wherein said walls comprise a material characterized by a high resistivity at room temperature, said resistivity decreasing by at least five orders of magnitude when said material is heated to approximately electron emission temperature.

107. The apparatus of claim 102, wherein said walls comprise a material is characterized by chemical inertness up to a maximum service temperature of said walls.

108. The apparatus of claim 102, wherein said walls comprise a material selected a group consisting of metal oxide, graphite and boron-nitride ceramic.

109. The apparatus of claim 108, wherein said metal oxide is selected from the group consisting of aluminum oxide and zirconium oxide.

110. The apparatus of claim 108, wherein said material comprises alumina.

111. The apparatus of claim 108, wherein said material is a source of electrons.

112. The apparatus of claim 111, wherein said material is selected such that a residue generated from said electrically neutral particles activates said material so as to increase said electron emission.

113. The apparatus of claim 111, wherein said material is selected such that a facilitating agent activates said material so as to increase said electron emission.

114. The apparatus of claim 113, wherein said facilitating agent is selected from the group consisting of $Cs_2CrO_4$ and $Cs_2CO_3$.

115. The apparatus of claim 102, wherein a diameter of said duct is in the range 50 microns to 300 microns.

116. The apparatus of claim 102, wherein a diameter of said duct is in the range of 100 microns to 160 microns.

117. The apparatus of claim 102, wherein said electrically neutral particles comprise carbon particles.

118. The apparatus of claim 117, wherein said electrically neutral particles comprise $C_{60}$ molecules.

119. The apparatus of claim 102, wherein said electrically neutral particles comprise an aggregate of different molecules.

120. The apparatus of claim 119, wherein said electrically neutral particles comprise a mixture of fullerenes.

121. The apparatus of claim 102, wherein said electrically neutral particles are selected from a group consisting of $I_2$, $SF_6$, $CFCl_3$, $WF_6$, F, Cl, and perhallogenated carbon compounds.

122. The apparatus of claim 102, wherein a body of said acceleration electrode comprises a centered orifice through which the anion beam emanates, said orifice being coaxial with an optical axis of the anion beam, and a central axis of said duct.

123. The apparatus of claim 102, further comprising a protection electrode defining a protected region, for substantially preventing emitted electrons from escaping said protected region.

124. The apparatus of claim 123, wherein a body of said protection electrode comprises a centered orifice through which the anion beam emanates, said orifice being coaxial with an optical axis of the anion beam, and a center of said duct.

125. The apparatus of claim 123, wherein said heating element is at a first electrical potential, and said protection electrode is at a second electrical potential, the first electrical potential being positive with respect to the second electrical potential.

126. The apparatus of claim 123, wherein said heating element is at a first electrical potential, and said protection electrode is at a second electrical potential, the first electrical potential being negative with respect to the second electrical potential.

127. The apparatus of claim 102, wherein said heating element comprises a rhenium ribbon, said ribbon wrapped around said walls, said ribbon electrically connected to a power supply.

128. The apparatus of claim 102, wherein said heating element comprises a heat-conductive body, kept at an electrical potential difference from an electron source, said heat-conductive body and said electron source being designed and constructed such that electrons, emitted by said electron source, accelerate in said electrical potential difference and bombard said heat-conductive body to thereby heat said heat-conductive body.

129. The apparatus of claim 102, wherein said heating element is at a first electrical potential, and said acceleration electrode is at a third electrical potential, the first electrical potential being negative with respect to the third electrical potential.

130. The apparatus of claim 102, further comprising one or more einzel lenses to focus the anionic beam.

131. The apparatus of claim 102, further comprising one or more gating electrodes for pulsed beam mode operation.

132. The apparatus of claim 102, further comprising deflector plates for raster scanning the anionic beam onto a surface.

133. The apparatus of claim 102, further comprising: a first ingress port and a second ingress port into said duct, wherein said first port enables the neutral particles to be passed through said duct and said second port enables a facilitator agent to be passed through said duct, and wherein a first flow rate of the neutral particles and a second flow rate of the facilitator agent through said duct are separately controllable.

134. A, system for analyzing substances ejected from a surface of a sample bombarded with a neutral particulate beam, comprising:

(a) a neutral particulate beam source, wherein said source comprises a duct defined by walls having an inner surface capable of sustaining a temperature above an electron emission temperature of said inner surface, so as to negatively charge electrically neutral particles being passed through said duct when said inner surface is heated to said temperature above said electron emission temperature; a heating element for heating said inner surface to said temperature above said electron emission temperature; and an acceleration electrode for ion-optically controlling and manipulating said negatively charged particles into the anion beam, whereby at least a portion of said negatively charged particles undergo electron autodetachment so as to generate an energetic neutral particulate beam, such that when the neutral beam bombards the surface, the neutral beam displaces substances of the surface; and (b) a detector for detecting the substances once ejected of the surface.

135. The system of claim 134, wherein said detector is emplaced to receive the substances, and wherein the sample is situated so that a path followed by the substances is crosswise to a path of the anion beam.

136. The system of claim 135, wherein said detector comprises an energy-mass analyzer.

137. The system of claim 136, wherein said detector utilizes a wide energy window.

138. The system of claim 134, wherein said walls comprise a material characterized by a maximum service temperature of 2000 K.

139. The system of claim 134, wherein said walls comprise a material characterized by a minimum service temperature of 1200 K.

140. The system of claim 134, wherein said walls comprise a material characterized by a melting point above 2200 K.

141. The system of claim 134, wherein said walls comprise a material characterized by a high resistivity at room temperature, said resistivity decreasing by at least five orders of magnitude when said material is heated to approximately electron emission temperature.

142. The system of claim 134, wherein said walls comprise a material is characterized by chemical inertness up to a maximum service temperature of said walls.

143. The system of claim 134, wherein said walls comprise a material selected a group consisting of metal oxide, graphite and boron-nitride ceramic.

144. The system of claim 143, wherein said metal oxide is selected from the group consisting of aluminum oxide and zirconium oxide.

145. The system of claim 143, wherein said material comprises alumina.

146. The system of claim 143, wherein said material is a source of electrons.

147. The system of claim 146, wherein said material is selected such that a residue generated from said electrically neutral particles activates said material so as to increase said electron emission.

148. The system of claim 146, wherein said material is selected such that a facilitating agent activates said material so as to increase said electron emission.

149. The system of claim 148, wherein said facilitating agent is selected from the group consisting of $Cs_2CrO_4$ and $Cs_2CO_3$.

150. The system of claim 134, wherein a diameter of said duct is in the range 50 microns to 300 microns.

151. The system of claim 134, wherein a diameter of said duct is in the range of 100 microns to 160 microns.

152. The system of claim 134, wherein said electrically neutral particles comprise carbon particles.

153. The system of claim 152, wherein said electrically neutral particles comprise $C_{60}$ molecules.

154. The system of claim 134, wherein said electrically neutral particles comprise an aggregate of different molecules.

155. The system of claim 154, wherein said electrically neutral particles comprise a mixture of fullerenes.

156. The system of claim 134, wherein said electrically neutral particles are selected from a group consisting of $I_2$, $SF_6$, $CFCl_3$, $WF_6$, F, Cl, and perhallogenated carbon compounds.

157. The system of claim 134, wherein a body of said acceleration electrode comprises a centered orifice through which the anion beam emanates, said orifice being coaxial with an optical axis of the anion beam, and a central axis of said duct.

158. The system of claim 134, wherein said anion beam source further comprises a protection electrode defining a protected region, for substantially preventing emitted electrons from escaping said protected region.

159. The system of claim 158, wherein a body of said protection electrode comprises a centered orifice through which the anion beam emanates, said orifice being coaxial with an optical axis of the anion beam, and a center of said duct.

160. The system of claim 158, wherein said heating element is at a first electrical potential, and said protection electrode is at a second electrical potential the first electrical potential being positive with respect to the second electrical potential.

161. The system of claim 158, wherein said heating element is at a first electrical potential, and said protection electrode is at a second electrical potential, the first electrical potential being negative with respect to the second electrical potential.

162. The system of claim 134, wherein said heating element comprises a rhenium ribbon, said ribbon wrapped around said walls, said ribbon electrically connected to a power supply.

163. The system of claim 134, wherein said heating element comprises a heat-conductive body, kept at an electrical potential difference from an electron source, said heat-conductive body and said electron source being designed and constructed such that electrons, emitted by said electron source, accelerate in said electrical potential difference and bombard said heat-conductive body to thereby heat said heat-conductive body.

164. The system of claim 134, wherein said heating element is at a first electrical potential, and said acceleration electrode is at a third electrical potential, the first electrical potential being negative with respect to the third electrical potential.

165. The system of claim 134, wherein said anion beam source further comprises one or more einzel lenses to focus the anionic beam.

166. The system of claim 134, wherein said anion beam source further comprises one or more gating electrodes for pulsed beam mode operation.

167. The system of claim 134, wherein said anion beam source further comprises deflector plates for raster scanning the anionic beam onto a surface.

168. The system of claim 134, wherein said anion beam source further comprises: a first ingress port and a second ingress port into said duct, wherein said first port enables the neutral particles to be passed through said duct and said second port enables a facilitator agent to be passed through said duct, and wherein a first flow rate of the neutral particles and a second flow rate of the facilitator agent through said duct are separately controllable.

169. A method for analyzing substances ejected from a surface of a sample bombarded with an anion beam, comprising:

(a) passing electrically neutral particles through a duct being defined by walls having an inner surface, while heating said inner surface to a temperature above an electron emission temperature of said inner surface, so as to negatively charge said particles, so as to obtain negatively charged particles; and ion-optically controlling and manipulating said negatively charged particles into the anion beam; and (b) detecting the substances once ejected of the surface.

170. The method of claim 169, further comprising deflecting electrons from an axis characterizing the anion beam.

171. The method of claim 169, wherein said deflecting said electrons is by a magnetic field.

172. The method of claim 169, further comprising: passing a facilitating agent through said duct in a simultaneous fashion with said electrically neutral particles so as to enhance the yield of said negatively charged particles.

173. The method of claim 172, wherein said facilitating agent enhances the efficiency of said electron emission.

174. The method of claim 169, further comprising: raster scanning the anionic beam onto a surface for analysis.

175. The method of claim 174, further comprising: analyzing a plurality of fragments emitted from the surface as a result of said raster scanning so as to determine a chemical composition of the surface.

176. The method of claim 169, wherein the anion beam is used for an application selected from a group consisting of atomic physics, molecular physics, plasma physics, thin film deposition, surface etching, ion implantation, submicron lithography, nano-electro-mechanical system construction, nanophotonic system construction, new material synthesis, and electric propulsion devices.

177. The method of claim 169, wherein the anion beam is used for an application selected from a group consisting of surface chemistry and catalysis, organic chemistry, biology, pharmacology and biotechnology.

178. The method of claim 169, wherein said walls comprise a material characterized by a melting point above 2200 K.

179. The method of claim 169, wherein said walls comprise a material characterized by a high resisitivity at room temperature, said resistivity decreasing by at least five orders of magnitude when said material is heated to approximately electron emission temperature.

180. The method of claim 169, wherein said walls comprise a material selected a group consisting of metal oxide graphite and boron-nitride ceramic.

181. The method of claim 169, wherein said metal oxide is selected from the group consisting of aluminum oxide and zirconium oxide.

182. The apparatus of claim 180, wherein said material comprises alumina.

183. The apparatus of claim 180, wherein said material is a source of electrons.

184. The method of claim 172, wherein said facilitating agent is selected from the group consisting of $Cs_2CrO_4$ and $Cs_2CO_3$.

185. The method of claim 172, wherein a diameter of said duct is in the range 50 microns to 300 microns.

186. The method of claim 172, wherein a diameter of said duct is in the range of 100 microns to 160 microns.

187. The method of claim 169, wherein said electrically neutral particles comprise carbon particles.

188. The method of claim 187, wherein said electrically neutral particles comprise $C_{60}$ molecules.

189. The method of claim 169, wherein said electrically neutral particles comprise an aggregate of different molecules.

190. The method of claim 189, wherein said electrically neutral particles comprise a mixture of fullerenes.

191. The method of claim 169, wherein said electrically neutral particles are selected from a group consisting of $I_2$, $SF_6$, $CFCl_3$, $WF_6$, F, Cl, and perhallogenated carbon compounds.

192. The method of claim 169, wherein a body of said acceleration electrode comprises a centered orifice through which the anion beam emanates, said orifice being coaxial with an optical axis of the anion beam, and a central axis of said duct.

193. The method of claim 169, further comprising using a protection electrode defining a protected region, for substantially preventing emitted electrons from escaping said protected region.

194. The method of claim 193, wherein a body of said protection electrode comprises a centered orifice through which the anion beam emanates, said orifice being coaxial with an optical axis of the anion beam, and a center of said duct.

195. The method of claim 193, wherein said heating element is at a first electrical potential, and said protection electrode is at a second electrical potential, the first electrical potential being positive with respect to the second electrical potential.

196. The method of claim 193, wherein said heating element is at a first electrical potential, and said protection electrode is at a second electrical potential, the first electrical potential being negative with respect to the second electrical potential.

197. The method of claim 169, wherein said heating is by a heating element having a rhenium ribbon, said ribbon wrapped around said walls, said ribbon electrically connected to a power supply.

198. The method of claim 169, wherein said heating is by a heating element having a heat-conductive body, kept at an electrical potential difference from an electron source, said heat-conductive body and said electron source being designed and constructed such that electrons, emitted by said electron source, accelerate in said electrical potential difference and bombard said heat-conductive body to thereby heat said heat-conductive body.

199. The method of claim 169, wherein said heating element is at a first electrical potential, and said acceleration electrode is at a third electrical potential, the first electrical potential being negative with respect to the third electrical potential.

200. The method of claim 169, further comprising using at least one einzel lens for focusing the anionic beam.

201. The method of claim 169, further comprising using at least one gating electrode for generating the anionic beam in a pulsed mode.

202. The method of claim 169, further comprising raster scanning the anionic beam onto a surface.

203. A method of generating a neutral particulate beam, comprising passing electrically neutral particles through a duct being defined by walls having an inner surface, while heating said inner surface to a temperature above an electron emission temperature of said inner surface, so as to negatively charge said particles, so as to obtain negatively charged particles; ion-optically controlling and manipulating said negatively charged particles into an anion beam, whereby at least a portion of said negatively charged particles undergo electron autodetachment; so as to generate a neutral particulate beam.

204. The method of claim 203, further comprising: redirecting the anion beam so that a first axis characterizing the anion beam is displaced angularly from a second axis characterizing the neutral beam.

205. The method of claim 203, further comprising deflecting electrons from an axis characterizing the anion beam.

206. The method of claim 203, wherein said deflecting said electrons is by a magnetic field.

207. The method of claim 203, further comprising: passing a facilitating agent through said duct in a simultaneous fashion with said electrically neutral particles so as to enhance the yield of said negatively charged particles.

208. The method of claim 207, wherein said facilitating agent enhances the efficiency of said electron emission.

209. The method of claim 203, further comprising: raster scanning the anionic beam onto a surface for analysis.

210. The method of claim 209, further comprising: analyzing a plurality of fragments emitted from the surface as a result of said raster scanning so as to determine a chemical composition of the surface.

211. The method of claim 203, wherein the anion beam is used for an application selected from a group consisting of atomic physics, molecular physics, plasma physics, thin film deposition, surface etching, ion implantation, submicron lithography, nano-electro-mechanical system construction, nanophotonic system construction, new material synthesis, and electric propulsion devices.

212. The method of claim 203, wherein the anion beam is used for an application selected from a group consisting of surface chemistry and catalysis, organic chemistry, biology, pharmacology and biotechnology.

213. The method of claim 203, wherein said walls comprise a material characterized by a melting point above 2200 K.

214. The method of claim 203, wherein said walls comprise a material characterized by a high resisitivity at room temperature, said resistivity decreasing by at least five orders of magnitude when said material is heated to approximately electron emission temperature.

215. The method of claim 203, wherein said walls comprise a material selected a group consisting of metal oxide graphite and boron-nitride ceramic.

216. The method of claim 203, wherein said metal oxide is selected from the group consisting of aluminum oxide and zirconium oxide.

217. The apparatus of claim 215, wherein said material comprises alumina.

218. The apparatus of claim 215, wherein said material is a source of electrons.

219. The method of claim 207, wherein said facilitating agent is selected from the group consisting of $Cs_2CrO_4$ and $Cs_2CO_3$.

220. The method of claim 207, wherein a diameter of said duct is in the range 50 microns to 300 microns.

221. The method of claim 207, wherein a diameter of said duct is in the range of 100 microns to 160 microns.

222. The method of claim 203, wherein said electrically neutral particles comprise carbon particles.

223. The method of claim 222, wherein said electrically neutral particles comprise $C_{60}$ molecules.

224. The method of claim 203, wherein said electrically neutral particles comprise an aggregate of different molecules.

225. The method of claim 224, wherein said electrically neutral particles comprise a mixture of fullerenes.

226. The method of claim 203, wherein said electrically neutral particles are selected from a group consisting of $I_2$, $SF_6$, $CFCl_3$, $WF_6$, F, Cl, and perhallogenated carbon compounds.

227. The method of claim 203, wherein a body of said acceleration electrode comprises a centered orifice through which the anion beam emanates, said orifice being coaxial with an optical axis of the anion beam, and a central axis of said duct.

228. The method of claim 203, further comprising using a protection electrode defining a protected region, for substantially preventing emitted electrons from escaping said protected region.

229. The method of claim 228, wherein a body of said protection electrode comprises a centered orifice through which the anion beam emanates, said orifice being coaxial with an optical axis of the anion beam, and a center of said duct.

230. The method of claim 228, wherein said heating element is at a first electrical potential, and said protection electrode is at a second electrical potential, the first electrical potential being positive with respect to the second electrical potential.

231. The method of claim 228, wherein said heating element is at a first electrical potential, and said protection electrode is at a second electrical potential the first electrical potential being negative with respect to the second electrical potential.

232. The method of claim 203, wherein said heating is by a heating element having a rhenium ribbon, said ribbon wrapped around said walls, said ribbon electrically connected to a power supply.

233. The method of claim 203, wherein said heating is by a heating element having a heat-conductive body, kept at an electrical potential difference from an electron source, said heat-conductive body and said electron source being designed and constructed such that electrons, emitted by said electron source, accelerate in said electrical potential difference and bombard said heat-conductive body to thereby heat said heat-conductive body.

234. The method of claim 203, wherein said heating element is at a first electrical potential, and said acceleration electrode is at a third electrical potential, the first electrical potential being negative with respect to the third electrical potential.

235. The method of claim 203, further comprising using at least one einzel lens for focusing the anionic beam.

236. The method of claim 203, further comprising using at least one gating electrode for generating the anionic beam in a pulsed mode.

237. The method of claim 203, further comprising raster scanning the anionic beam onto a surface.

238. A method for analyzing substances ejected from a surface of a sample bombarded with a neutral particulate beam, comprising:

(a) passing electrically neutral particles through a duct being defined by walls having an inner surface, while beating said inner surface to a temperature above an electron emission temperature of said inner surface, so as to negatively charge said particles, so as to obtain negatively charged particles, ion-optically controlling and manipulating said negatively charged particles into the anion beam, and focusing from said anion beam a separate energetic neutral beam by electron autodetachment from a portion of said negatively charged particles; and (b) detecting the substances once ejected of the surface.

239. The method of claim 238, further comprising: redirecting the anion beam so that a first axis characterizing the anion beam is displaced angularly from a second axis characterizing the neutral beam.

240. The method of claim 238, further comprising deflecting electrons from an axis characterizing the anion beam.

241. The method of claim 238, wherein said deflecting said electrons is by a magnetic field.

242. The method of claim 238, further comprising: passing a facilitating agent through said duct in a simultaneous fashion with said electrically neutral particles so as to enhance the yield of said negatively charged particles.

243. The method of claim 242, wherein said facilitating agent enhances the efficiency of said electron emission.

244. The method of claim 238, further comprising: raster scanning the anionic beam onto a surface for analysis.

245. The method of claim 244, further comprising: analyzing a plurality of fragments emitted from the surface as a result of said raster scanning so as to determine a chemical composition of the surface.

246. The method of claim 238, wherein the anion beam is used for an application selected from a group consisting of atomic physics, molecular physics plasma physics, thin film deposition, surface etching, ion implantation, submicron lithography, nano-electro-mechanical system construction, nanophotonic system construction, new material synthesis, and electric propulsion devices.

247. The method of claim 238, wherein the anion beam is used for an application selected from a group consisting of surface chemistry and catalysis, organic chemistry, biology, pharmacology and biotechnology.

248. The method of claim 238, wherein said walls comprise a material characterized by a melting point above 2200 K.

249. The method of claim 238, wherein said walls comprise a material characterized by a high resisitivity at room temperature, said resistivity decreasing by at least five orders of magnitude when said material is heated to approximately electron emission temperature.

250. The method of claim 238, wherein said walls comprise a material selected a group consisting of metal oxide graphite and boron-nitride ceramic.

251. The method of claim 238, wherein said metal oxide is selected from the group consisting of aluminum oxide and zirconium oxide.

252. The apparatus of claim 250, wherein said material comprises alumina.

253. The apparatus of claim 250, wherein said material is a source of electrons.

254. The method of claim 242, wherein said facilitating agent is selected from the group consisting of $Cs_2CrO_4$ and $Cs_2CO_3$.

255. The method of claim 242, wherein a diameter of said duct is in the range 50 microns to 300 microns.

256. The method of claim 242, wherein a diameter of said duct is in the range of 100 microns to 160 microns.

257. The method of claim 238, wherein said electrically neutral particles comprise carbon particles.

258. The method of claim 257, wherein said electrically neutral particles comprise $C_{60}$ molecules.

259. The method of claim 238, wherein said electrically neutral particles comprise an aggregate of different molecules.

260. The method of claim 259, wherein said electrically neutral particles comprise a mixture of fullerenes.

261. The method of claim 238, wherein said electrically neutral particles are selected from a group consisting of $I_2$, $SF_6$, $CFCl_3$, $WF_6$, F, Cl, and perhallogenated carbon compounds.

262. The method of claim 238, wherein a body of said acceleration electrode comprises a centered orifice through which the anion beam emanates, said orifice being coaxial with an optical axis of the anion beam, and a central axis of said duct.

263. The method of claim 238, further comprising using a protection electrode defining a protected region, for substantially preventing emitted electrons from escaping said protected region.

264. The method of claim 263, wherein a body of said protection electrode comprises a centered orifice through which the anion beam emanates, said orifice being coaxial with an optical axis of the anion beam, and a center of said duct.

265. The method of claim 263, wherein said heating element is at a first electrical potential, and said protection electrode is at a second electrical potential, the first electrical potential being positive with respect to the second electrical potential.

266. The method of claim 263, wherein said heating element is at a first electrical potential, and said protection electrode is at a second electrical potential, the first electrical potential being negative with respect to the second electrical potential.

267. The method of claim 238, wherein said heating is by a heating element having a rhenium ribbon, said ribbon wrapped around said walls, said ribbon electrically connected to a power supply.

268. The method of claim 238, wherein said heating is by a heating element having a heat-conductive body, kept at an electrical potential difference from an electron source, said heat-conductive body and said electron source being designed and constructed such that electrons, emitted by said electron source, accelerate in said electrical potential difference and bombard said heat-conductive body to thereby heat said heat-conductive body.

269. The method of claim 238, wherein said heating element is at a first electrical potential, and said acceleration electrode is at a third electrical potential, the first electrical potential being negative with respect to the third electrical potential.

270. The method of claim 238, further comprising using at least one einzel lens for focusing the anionic beam.

271. The method of claim 238, further comprising using at least one gating electrode for generating the anionic beam in a pulsed mode.

272. The method of claim 238, further comprising raster scanning the anionic beam onto a surface.

* * * * *